United States Patent
Zhang et al.

(10) Patent No.: US 11,071,113 B2
(45) Date of Patent: **\*Jul. 20, 2021**

(54) FREQUENCY BAND ADAPTIVE WIRELESS COMMUNICATION

(71) Applicant: T-Mobile USA, Inc., Bellevue, WA (US)

(72) Inventors: Hongliang Zhang, Sammamish, WA (US); Mark McDiarmid, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,059

(22) Filed: Mar. 13, 2020

(65) Prior Publication Data

US 2020/0288475 A1 Sep. 10, 2020

Related U.S. Application Data

(63) Continuation of application No. 16/015,740, filed on Jun. 22, 2018, now Pat. No. 10,595,317, which is a
(Continued)

(51) Int. Cl.
*H04W 72/04* (2009.01)
*H04L 1/00* (2006.01)
(Continued)

(52) U.S. Cl.
CPC ....... *H04W 72/0453* (2013.01); *H04L 1/0006* (2013.01); *H04L 1/04* (2013.01);
(Continued)

(58) Field of Classification Search
CPC ............ H04W 72/085; H04W 72/0453; H04L 5/006; H04L 5/003; H04L 1/04; H04L 1/0006
See application file for complete search history.

(56) References Cited

U.S. PATENT DOCUMENTS 6,466,793 B1 * 10/2002 Wallstedt .............. H04W 16/10
455/444
7,477,621 B1 * 1/2009 Loc ....................... H04W 28/20
370/329
(Continued)

OTHER PUBLICATIONS

Zhu et al., "QoS Aware Wireless Bandwidth Aggregation (QAWBA) by Integrating Cellular and Ad-hoc Networks", Dec. 13, 2004, IEEE, Proceedings of the First International Conference on Quality of Service in Heterogeneous Wired/Wireless Networks (QSHINE'04), pp. 1-8 (Year: 2004).*

*Primary Examiner* — Paul H Masur
(74) *Attorney, Agent, or Firm* — Knobbe, Martens, Olson & Bear, LLP

(57) ABSTRACT

A system, apparatus and method is disclosed for multiband wireless communication. Frequency bands and/or transmission formats are identified as available within a range for wireless communication. The system evaluates signal quality metrics for each frequency band and selects a communication method based on the evaluation. Multiple frequency bands and communication methods can be utilized by the system such that a combination of licensed, unlicensed, semilicensed, and overlapped frequency bands can be simultaneously used for communication. The system monitors communications and can report link performance for adaptive control of the selected communication methods.

20 Claims, 17 Drawing Sheets

Related U.S. Application Data continuation of application No. 15/460,545, filed on Mar. 16, 2017, now Pat. No. 10,028,280, which is a continuation of application No. 14/611,552, filed on Feb. 2, 2015, now Pat. No. 8,609,652, which is a continuation of application No. 14/076,548, filed on Nov. 11, 2013, now Pat. No. 8,958,751, which is a continuation of application No. 13/540,530, filed on Jul. 2, 2012, now Pat. No. 8,583,047, which is a continuation of application No. 11/996,928, filed as application No. PCT/US2006/028334 on Jul. 21, 2006, now Pat. No. 8,213,867.

(60) Provisional application No. 60/702,883, filed on Jul. 27, 2005.

(51) Int. Cl.
*H04L 1/04* (2006.01)
*H04W 72/08* (2009.01)
*H04W 24/08* (2009.01)
*H04L 5/00* (2006.01)

(52) U.S. Cl.
CPC ......... *H04W 24/08* (2013.01); *H04W 72/085* (2013.01); *H04L 5/003* (2013.01); *H04L 5/006* (2013.01)

(56) References Cited

U.S. PATENT DOCUMENTS

| | | | |
|---|---|---|---|
| 2002/0019214 A1* | 2/2002 | Brown | H04W 40/00 455/67.11 |
| 2002/0106010 A1* | 8/2002 | Jones | H04L 5/0046 375/219 |
| 2004/0125768 A1* | 7/2004 | Yoon | H04W 16/10 370/331 |

* cited by examiner

FREQUENCY BAND ADAPTIVE WIRELESS COMMUNICATION

RELATED APPLICATIONS

This application is a continuation of U.S. patent application Ser. No. 16/015,740, filed on Jun. 22, 2018, entitled "Frequency Band Adaptive Wireless Communication,", which is a continuation of U.S. patent application Ser. No. 15/460,545, filed on Mar. 16, 2017, entitled "Frequency Band Adaptive Wireless Communication,", which is a continuation of U.S. patent application Ser. No. 14/611,552, filed Feb. 2, 2015, entitled "Frequency Band Adaptive Wireless Communication," which is a continuation of U.S. patent application Ser. No. 14/076,548, filed Nov. 11, 2013, entitled "Frequency Band Adaptive Wireless Communication," which is a continuation of U.S. patent application Ser. No. 13/540,530, filed Jul. 2, 2012, entitled "Frequency Band Adaptive Wireless Communication," which is a continuation of U.S. patent application Ser. No. 11/996,928, filed Jul. 2, 2008, entitled, "Frequency Band Adaptive Wireless Communication," which is a national stage entry of PCT/US2006/028334, filed Jul. 21, 2006, entitled, "Frequency Band Adaptive Wireless Communication," which claims the benefit of U.S. Provisional Patent Application No. 60/702,883, filed Jul. 27, 2005, each of which is hereby incorporated herein by reference in its entirety.

FIELD

This present disclosure relates generally to a system, apparatus and method for multiband wireless communication. Frequency bands and/or transmission formats are identified as available within a range for wireless communication. Signal quality metrics for each available frequency band are evaluated so that at least one of the identified frequency bands can be selected for communication based on the determined signal quality.

BACKGROUND

Conventional wireless devices are designed to work or operate in a specified frequency range or band with limited transmit power levels. The major types of frequency bands regulated by the Federal Communications Commission (FCC) include licensed bands, semilicensed bands, unlicensed bands and overlapped bands. The FCC has specific transmit power limits for each of the described bands to provide public safety and to reduce potential co-band and adjacent band interference levels.

Example licensed frequency bands include cellular telephony or Personal Communication Service (PCS) bands. Cellular communications in the U.S. typically operate in the frequency ranges of 824-849 MHz, and 869-894 MHz. Broadband PCS communications in the U.S. typically operate in the frequency ranges of 1850-1910 MHz and 1930-1990 MHz, while narrowband PCS typically operates in the frequency ranges of 901-902 MHz, 930-931 MHz, and 940-941 MHz. Recently, an additional 50 MHz frequency band (4940-4990 MHz) has become available that is referred to as the 4.9 GHz licensed band as designated by the FCC for support of public safety. Other licensed bands such as so called Third Generation (3G) wireless communications are contemplated by the present disclosure, including frequency bands such as 1710-1755 MHz, 2110-2155 MHz, 2305-2320 MHz, 2345-2360 MHz (Wireless Communication Services, WCS band), and 2500-2690 MHz (Multichannel Multipoint Distribution Services, MMDS band). Licensees to a licensed band usually have an exclusive right to provide services with the band in a specified geographic area, for a defined term and within specified times. The license is exclusive in the sense that no other service providers are typically allowed to provide services in the same band, in the same area and at the same time. Other licensed bands contemplated include, but are not limited to, a licensed band identified as allocated for WiMax (WiMAX is defined as Worldwide Interoperability for Microwave Access).

The FCC has recently opened a semilicensed band in the 3.65 GHz to 3.7 GHz range. The semilicensed band is a nationwide band available to all licensees under nonexclusive terms. Licensees to the semilicensed band are required to coordinate among themselves to reduce mutual interference levels and to share the band equally when coexisting within the same region. The semilicensed band is free to all licensees and no limit is set on the number of licensees.

Unlicensed frequency bands such as Industrial Scientific and Medical (ISM) frequency bands and Unlicensed National Information Infrastructure (UNIT) frequency bands are well known and can be shared by any number of devices. These unlicensed bands typically include frequencies such as 900 MHz, 2.4 GHz, 5.0 GHz and 5.8 GHz, which are commonly used for cordless telephones, wireless local area networks (WLANs) and Bluetooth devices.

Overlapped bands are frequency bands within the range from 3.1 GHz to 10.6 GHz. An example overlapped band is allocated for the use of so called ultra-wideband (UWB) devices. The UWB band is an unlicensed frequency band that overlaps with many licensed bands within its frequency range.

The present disclosure has identified a system, apparatus and method that capitalizes on use of all of the available frequency bands so that at least one available frequency band can be selected for communication based on a determination of the overall signal quality level for each available frequency band. All frequency bands, whether licensed, semilicensed or unlicensed, are considered valuable and can be utilized to achieve maximum spectrum efficiency in accordance with the present disclosure.

DETAILED DESCRIPTION

The present disclosure relates generally to a system, apparatus and method for multiband wireless communication. Frequency bands and/or transmission formats are identified as available within a range for wireless communication. Signal quality metrics for each available frequency band are evaluated so that at least one of the identified frequency bands can be selected for communication based on the determined signal quality.

The present description relates to a communication system, apparatus and method that can be used to facilitate improved communications with a wireless communication device. Example wireless communication devices include, but are not limited to, cellular telephone devices and personal data assistant (PDA) devices that are configured for wireless communications. A wireless communication device can utilize any number of available frequency bands, whether licensed, semilicensed, unlicensed and/or overlapped, to establish a communication link that has the best available radio link performance and/or the best spectrum efficiency as determined by signal quality metrics or criteria.

Briefly stated, a system, apparatus and method are disclosed for multiband wireless communication. Frequency bands and/or transmission formats are identified as available within a range for wireless communication. Signal quality metrics for each frequency band are evaluated by a receiver to identify qualified frequency bands. The qualified frequency bands can be ranked according to one or more combination of signal quality metrics, where the list of qualified bands can be communicated to a transmitter. The transmitter is arranged to evaluate the list of qualified bands and select a communication method based on the available frequency bands and a selected communication optimization scenario. Multiple frequency bands and communication methods can be utilized by the transmitter such that a combination of licensed, unlicensed, semilicensed, and overlapped frequency bands can be used for communication simultaneously. The receiver continually monitors communications and can report link performance to the transmitter for adaptive control of the selected communication methods.

System Overview

There are two types of components that are utilized in the present system, namely a base station/access point and a handset/data client device. Each of the various system components has a similar radio device architecture, as will be described below with reference to FIG. 1.

Figure 1:
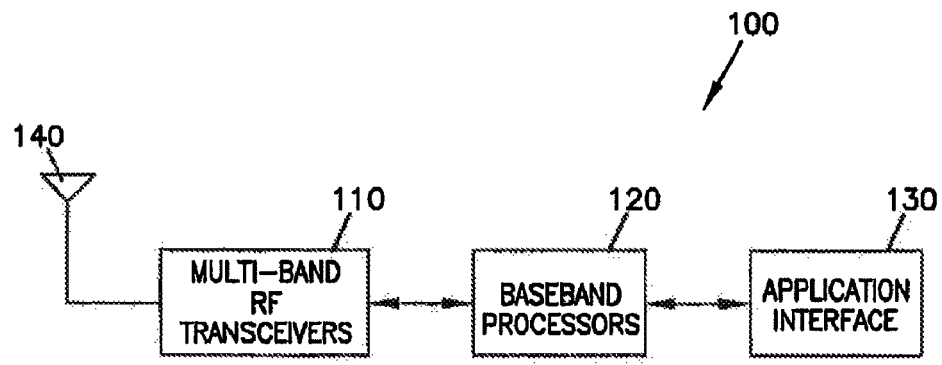
FIG. 1 is an illustration of block level radio device architecture arranged for frequency band adaptive operation.

As illustrated in FIG. 1, a block level radio device architecture (100) includes one or more multiband RF transceivers (110), one or more baseband processors (120), and an application interface (130). Each multiband RF transceiver (110) is arranged in communication with at least one antenna (140) and at least one of the baseband processors (120). The baseband processors are arranged to process received signals from and signals to be transmitted to the multiband RF transceivers (110) and coordinate with the application interface (130).

In some embodiments, each RF transceiver (110) can be arranged to cover a single frequency band so that the RF transceivers collectively provide facility for multiband communication. In other embodiments, a single RF transceiver can be arranged to use band adaptive RF chains with a wide range frequency synthesizer that is appropriately adapted for multiband use. In yet other embodiments, a soft radio RF transceiver is arranged to cover all possible frequency bands. Examples of soft radio applications includes Personal Communication Services or PCS frequency bands such as 1800 GHz/1900 GHz bands, Industrial Scientific and Medical or ISM frequency bands such as 2.4 GHz non-exclusive bands such as 3.65 GHz, Unlicensed National Information Infrastructure (UNIT) frequency bands such as 5.0 GHz and 5.8 GHz bands.

Antenna 140 can be a single multiband antenna or a collection of antennas where each individual antenna is arranged for covering a specific frequency band. In some embodiments, receiver and transmitter portions of each multiband RF transceiver can use separate antennas. In other embodiments, the transmitter and receiver portions of the RF transceiver can be arranged to use a common antenna. Although described above in terms of a separate receiver and transmitter portion, it is contemplated in the present disclosure that designations of receivers and transmitters can be integrated into a single transceiver block or divided into separate receiver and transmitter portions.

Figure 2:
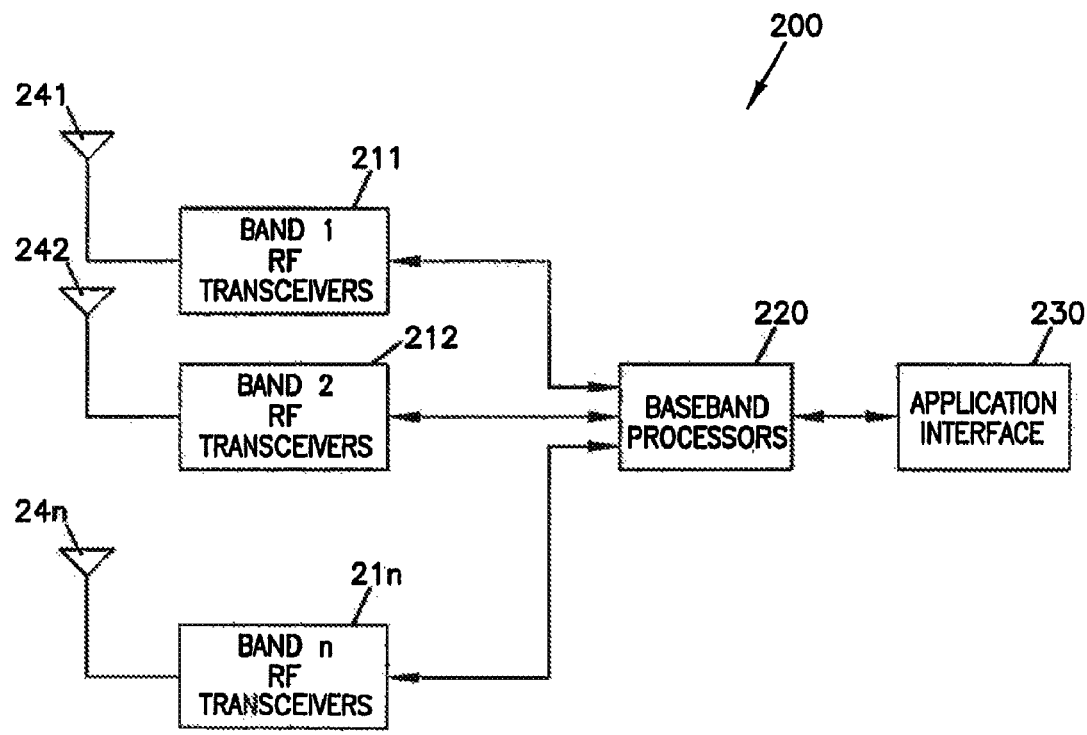
FIG. 2 is an illustration of another block level radio device architecture arranged for frequency band adaptive operation.

As illustrated in FIG. 2, another block level radio device architecture (200) includes "n" multiband RF transceivers (211, 212 . . . 21n), one or more baseband processors (220), and an application interface (230). In this example, each multiband RF transceiver (211, 212 . . . 21n) is arranged in communication with a respective antenna (241, 242 . . . 24n) and also in communication with at least one of the baseband processors (220). The baseband processors are arranged to process received signals from and signals to be transmitted to the multiband RF transceivers (210, 211 . . . 21n) and coordinate with the application interface (230).

The described baseband processors are responsible for all transmission signal processing functions. Based on various evaluation criteria, the baseband processor can select a single transmission type for communication over a single frequency band or adaptively combine multiple transmission types for communication over multiple frequency bands. The baseband processors are configured to evaluate all relevant communication signal quality metrics (e.g., noise level, interference level, receiver signal level, link performance, bit-error rate, etc.) to determine which frequency bands to utilize for communication.

Network Topologies for Multiband Communications

The described communication system can be used, for example, in a point-to-point network, in a point-to-multipoint (P-MP) network, in a wireless local area network (WLAN) or in a mesh network.

Figure 3:
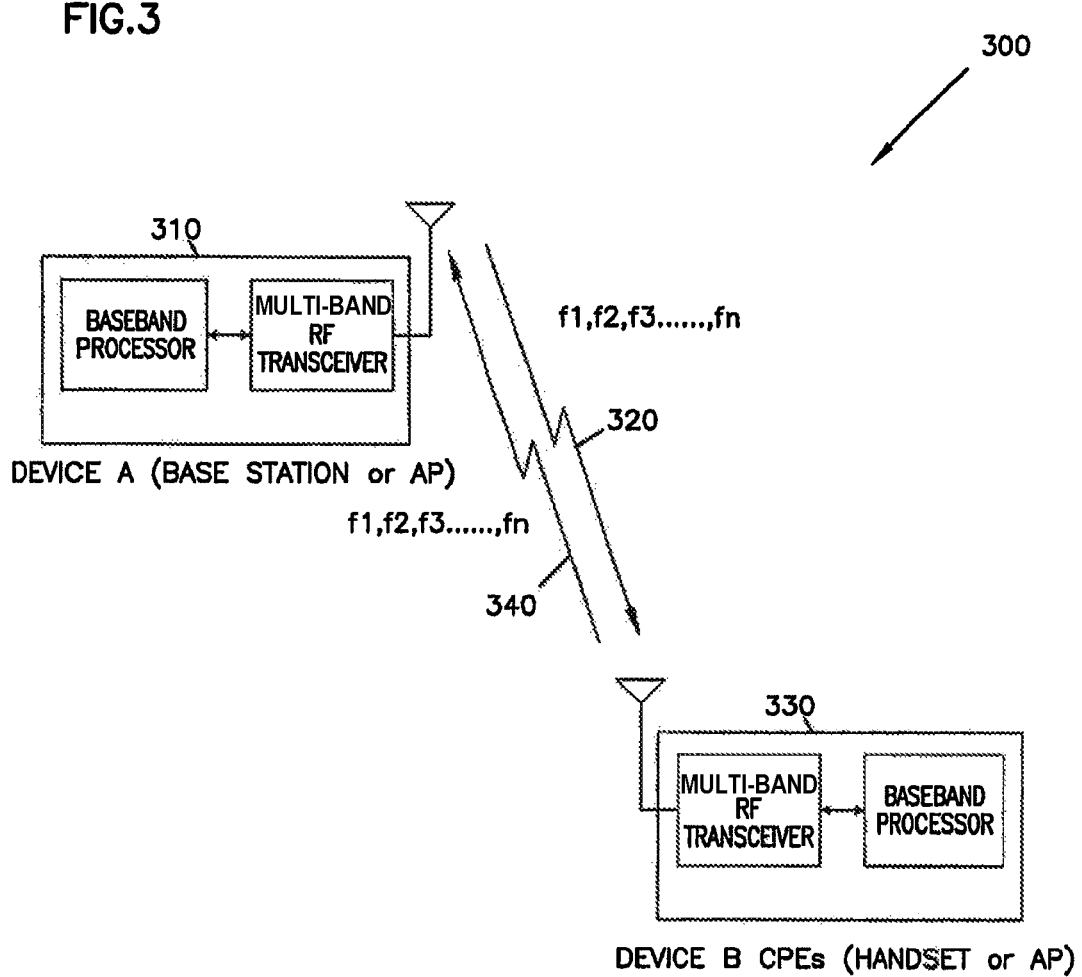
FIG. 3 is a diagram illustrating a point-to-point network system that is used with radio devices arranged for frequency band adaptive operation.

A point-to-point network system (300) is illustrated in FIG. 3. As illustrated, a first device (Device A, 310) is in direct communication with a second device (Device B, 330). Each device includes a baseband processor and a multiband transceiver that is arranged in accordance with the present disclosure for transmitting (320) and receiving (340) over multiband (e.g., f1, f2 . . . fn) with adaptive communications. Device A can be a base station device or an access point depending on the available communication services available within the region. Device B can also be an access point, a wireless communication device such as a cellular telephone, a WiFi device or some other device.

While point-to-point networks can provide high-speed interconnect links, they often do not easily scale into large scale networks. Point-to-point networks are useful, however, as wireless backhaul connections between base stations in a cellular communication network or as an access point in a WiFi network to bridge into a core network. Other applications of point-to-point networks include connections to ultra-wide band (UWB) devices, cordless telephones, Bluetooth devices or other devices that have similar radio transmission features.

Figure 4:
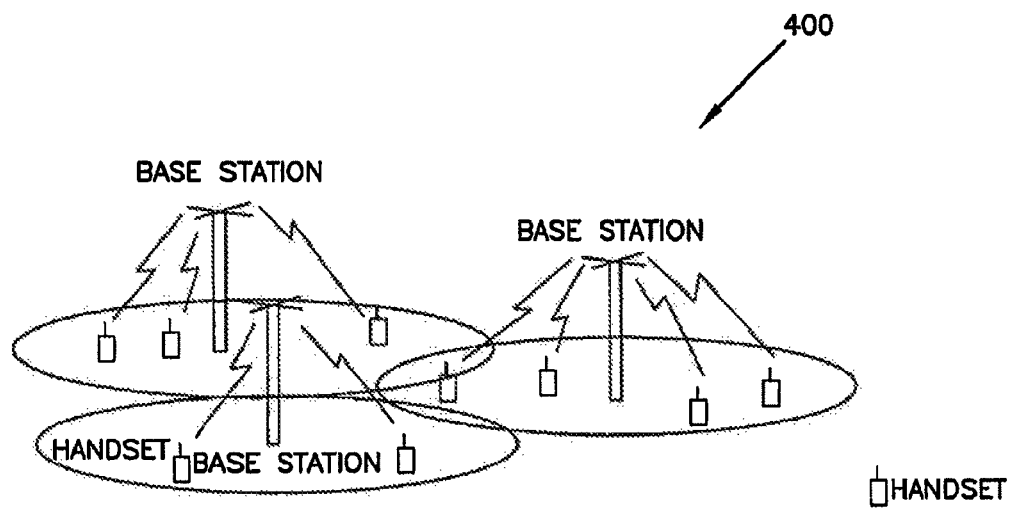
FIG. 4 is a diagram illustrating a point-to-multi-point network system that is used with radio devices arranged for frequency band adaptive operation.

FIG. 4 illustrates a point-to-multi-point (P-MP) network (400) system architecture. Cellular networks such as Global System for Mobile Communication (GSM) networks and Personal Communication Services (PCS) networks are P-MP systems. A P-MP network typically includes a number of cell sites within a calling region, in which each cell may consist of three, four, or six sectors. A cell or a sector in a cell has a serving base station that is arranged to receive and transmit communications to handset devices. In a P-MP wireless local area network (WLAN), access points take the place of the base stations so that multiple data clients such as laptop computers, personal data assistants (PDAs), personal information managers (PIMs) or other wireless LAN devices can simultaneously communicate with the access points (APs). In some instances computing devices such as desktop computers and laptop computers are configured for wireless communication with a printed circuit (PC) card or a Personal Computer Memory Card International Association (PCMCIA) card.

Figure 5:
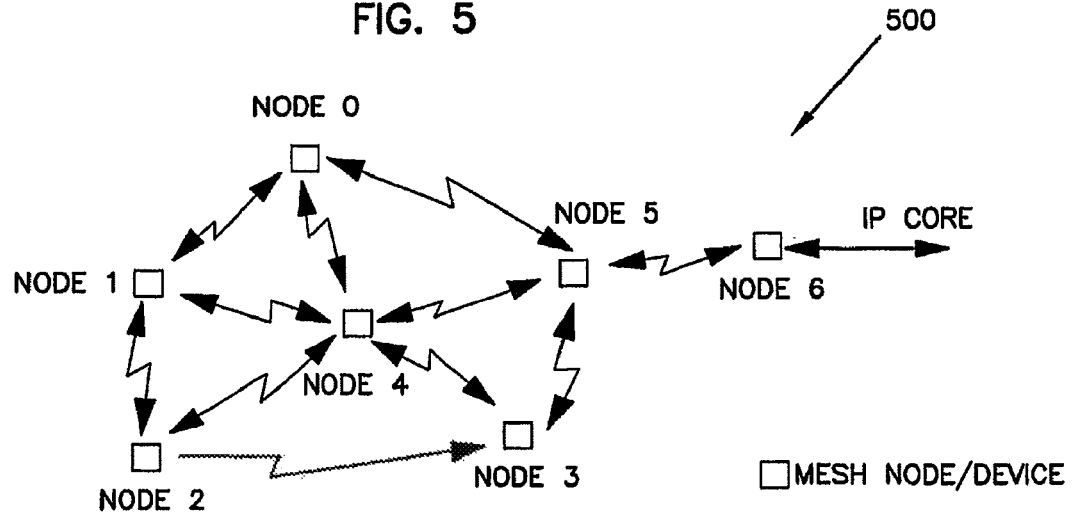
FIG. 5 is a diagram illustrating a mesh network system that is used with radio devices arranged for frequency band adaptive operation.

FIG. 5 illustrates a mesh network (500) system architecture. Mesh networks may consist of many similar and/or identical devices that each serve as a mesh node in the network. Radio transmissions between adjacent nodes are similar to point-to-point systems, where devices at both ends of a radio transmission link are referred to as peer stations, which may have the same or similar minimum transmission features. When a fault occurs at one node in a mesh network, network traffic can be directed to any of the remaining nodes. Mesh networks can be used for WiFi network applications.

Frequency-Band Adaptive Communications—Generally

The present disclosure contemplates a system, apparatus and method for adaptively utilizing a combination of licensed, unlicensed, semilicensed, and overlapped frequency bands for communication. Example licensed frequency bands include cellular bands such as 800/900 MHz bands, PCS bands such as 1800/1900 MHz bands, and the 4.9 GHz band for broadband public safety. Unlicensed frequency bands include the 900 MHz band, the 2.4 GHz band, the 5.0 GHz band and the 5.8 GHz band. Example semilicensed bands include the 3.65 GHz band. Example overlapped bands include UWB bands such as 3.1 GHz-10.6 GHz.

The described system uses a new transmission architecture in which both transmitter and receiver of a wireless link employ a multiple frequency band RF transceiver and a baseband processor as previously described above. In one example configuration, all unlicensed/semilicensed bands may be covered by a multiband RF transceiver, in which one or more baseband processors in both the transmitter and the receiver host all wireless transmission algorithms for adaptively using multiple frequency bands. Transmit and receive baseband processors can be arranged to work together to enhance the wireless link transmission performance based on link quality criteria such as data throughput, bit-error-rate (BER), reliability and so on. The system is configured to selectively and/or simultaneously use available frequency bands in the communication link based on transmission goals, transmit power limits and receiver measurements associated with each frequency band. Transmission methods or scenarios of using multiple frequency bands with the defined transmission architecture include, but are not limited to, multiband multiplexing, frequency diversity, frequency hopping, band hopping and a variety of combinations of these and other transmission methods.

The transmitter can be arranged to select an optimal transmission method based on transmission performance goals, transmission power limits, propagation properties of each band and interference plus noise level measurement from the receiver of the wireless link in each band. The receiver of the wireless link is arranged to frequently make measurements on different bands for the purposes of surveying and assessing the channel conditions in each band. The measurements are used as decision support information for the band adaptive transmission algorithms. The measurements contemplated include at least the following for each channel, each frequency, each set of channels, or each set of frequencies: noise levels, interference levels, noise plus interference levels and received signal strength indicator (RSSI) levels. Example frequency and frequency bands that are contemplated include at least 1.8/1.9 GHz, 2.4 GHz, 3.65 GHz, 5.0 GHz and 5.8 GHz bands. Example link performance parameters include at least bit-error-rate (BER), symbol-error-rate (SER), block-error-rate (BLER), frame-error-rate (FER), mean-square-error (MSE) and data throughput rate. The receiver frequently feeds these measurements and error rates back to the transmitter upon request.

Overall, a wireless link is adaptively operated over multiple frequency bands for the purpose of optimizing link or system performance such as data throughput, bit-error-rate (BER), coverage and reliability. The frequency band adaptation method of the present disclosure may be combined with traditional link adaptation and other Multiple Input Multiple Output (MIMO) techniques to achieve further transmission optimization.

The overall spectrum efficiency and radio transmission performance can be optimized with the presently described methods. In many locations and time instances, unlicensed bands may experience less interference and the bands could be used to provide services or to enhance other radio transmission over licensed band. The present disclosure describes a method to adaptively use available bands based on transmission goals, propagation environment and evaluated communication link performance.

Frequency-Band Adaptive Communication Methods

Figure 6:
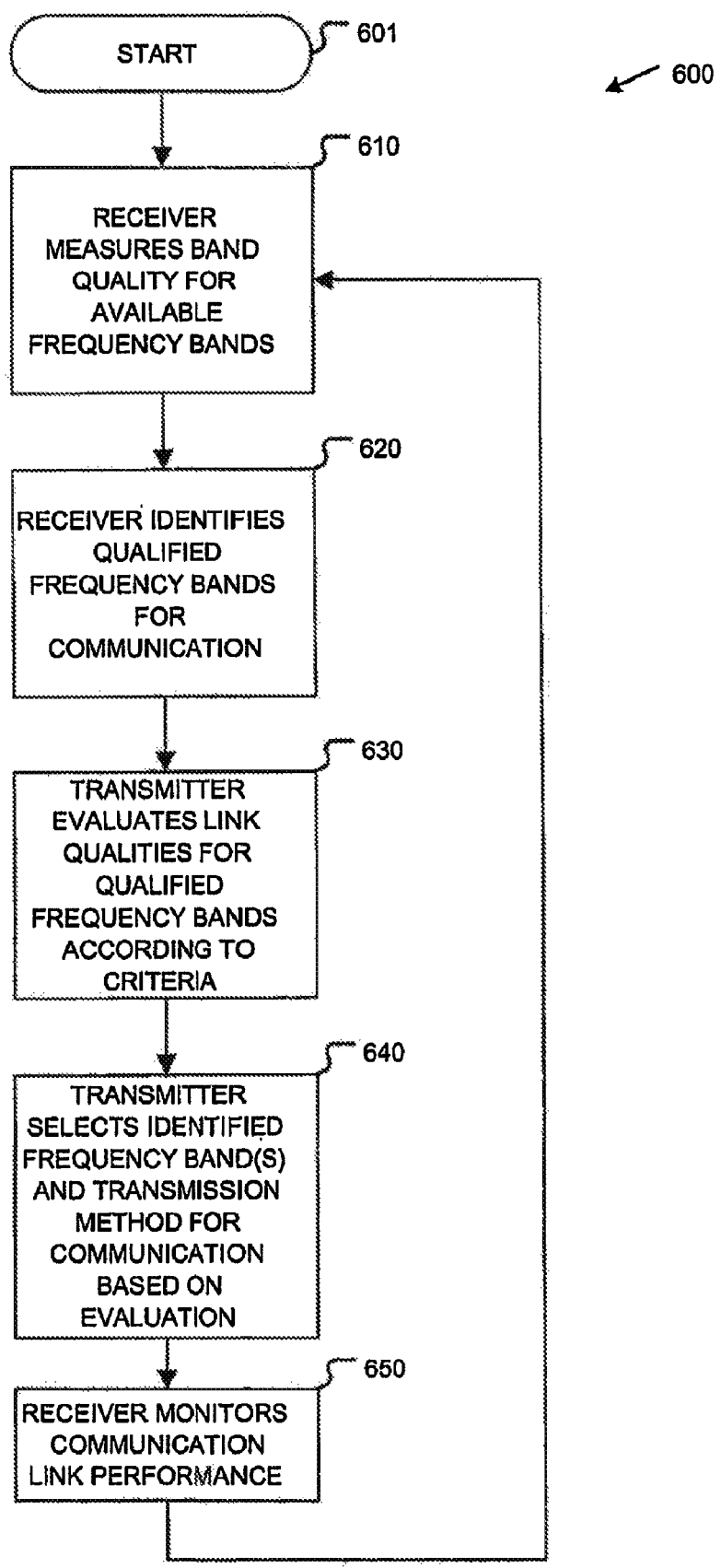
FIG. 6 illustrates a basic system flow for applying the frequency band adaptive communication method.

FIG. 6 illustrates a basic system flow (600) for applying the frequency band adaptive communication method.

After the system starts operating (601), the receiver identifies all of the frequency bands that are available for communication. The receiver will make the initial assessment of the available frequency bands by measuring band quality such as signal levels in each band (610). When the signal levels are satisfactory (e.g., noise/interference is not excessive), the receiver will qualify the frequency band as available for communication (620).

The transmitter will request the list of qualified frequency bands and/or corresponding measurements from the receiver and will evaluate the link quality associated with the qualified frequency bands according to some scenario/criteria (630). After the transmitter has evaluated the link quality, the transmitter selects a transmission method based on the evaluation of the identified bands (640). The selected communication method can include transmission of data over a single frequency band or over multiple frequency bands depending on the dynamically evaluated performance of the available frequency bands in accordance with the link adaptation method. Examples of performance criteria/scenarios include optimal transmit power allocation over qualified bands, maximum data throughput, highest signal levels, lowest interference levels, etc.

Data is then transmitted using the selected transmission methods with the multiband RF transmitter. The receiver's signal processing continues to monitor and evaluate the performance of the communication link while the transmitter is transmitting (650). The performance metrics for the communication link can be fed back to the transmitter, upon request, for further evaluation.

The available frequency bands may change over time based on various interference levels, changing environmental factors, as well as movement of communication devices in the case of mobile device. Because the receiver continually monitors and identifies qualified frequency bands, and continually reports the qualified frequency bands to the transmitter, the transmitter can dynamically change the selected transmission methods as needed.

Figure 7:
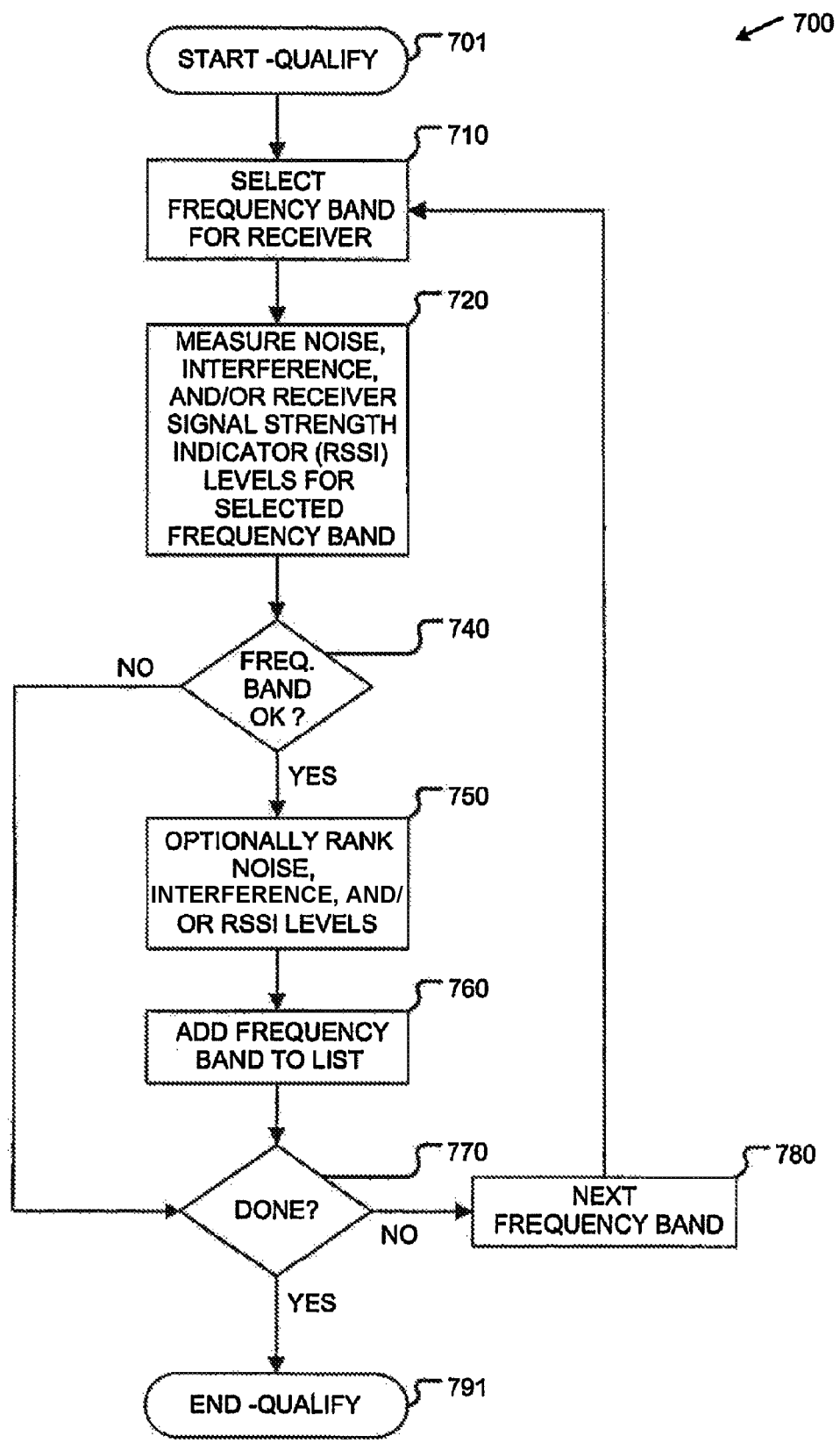
FIG. 7 illustrates a system flow for a qualification process for available frequency bands in a receiver of a frequency band adaptive communication device.

FIG. 7 illustrates a system flow (700) for the receiver's qualification process for available frequency bands. After the qualification process is started (701), a frequency band is selected for evaluation (710). Noise levels, interference levels and/or receiver signal strength indicator (RSSI) levels for the selected frequency band are evaluated (720) to determine if the selected frequency band is satisfactory for communication (740). When the frequency band is satisfactory, the frequency band is added to the list of qualified frequency bands (760), including any relevant indicia of the frequency band's quality. If additional frequency bands are to be evaluated (770), then the next frequency band is selected (780) and the process repeats until all frequency bands are evaluated.

In some embodiments, the RSSI levels are ranked by the receiver's baseband processor (750) so that the qualified list is provided as an ordered list based on signal strength. In another example, the interference levels are used to rank the qualified frequency band list. In still another example, the noise levels are used to rank the qualified frequency band list. In yet another example, a combination of RSSI levels, interference levels and/or noise levels are used to rank the qualified frequency band list. In still a further example, any one of the measured signal qualities is included along with the designator for the frequency band in the qualified list so that the transmitter's logic can utilize the information for the frequency band adaptive selection process.

In some embodiments, the process of qualifying available frequency bands by the receiver is not performed sequentially as is illustrated by the iterative looping structure depicted in FIG. 7. Instead, the qualification process for each frequency band can be conducted in parallel with one another.

The receiver can qualify a frequency band when the RSSI level is greater than a pre-determined threshold level. The selection of the RSSI level threshold can be different for each frequency band and based on the transmissions' maximum tolerance to interference in the specified frequency band. For example, interference in a licensed band can be higher than that for a semilicensed band because semilicensed bands are typically operated with self-controlled transmit power schemes. Thus, the semilicensed band is shared more fairly.

Figure 8:
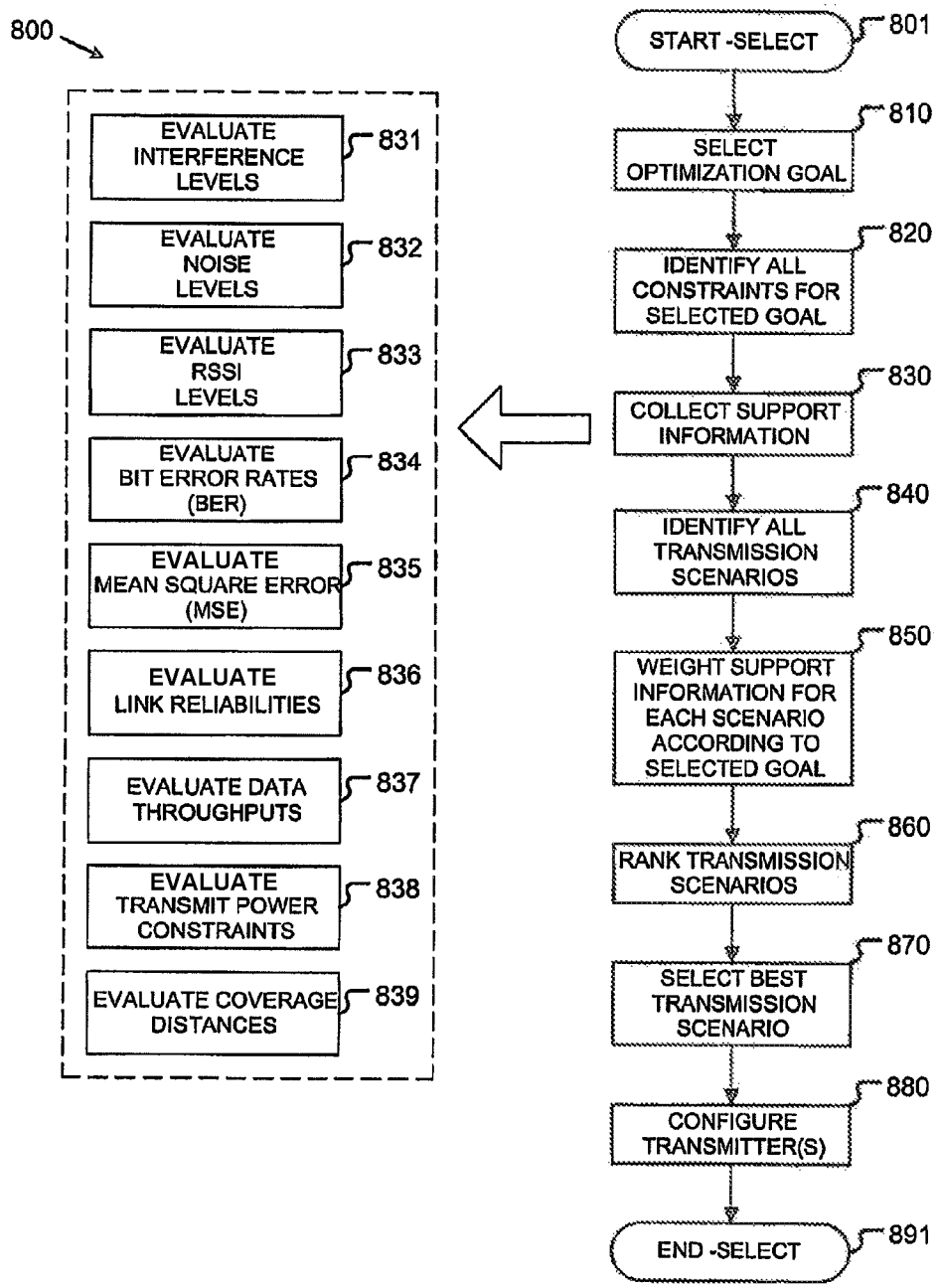
FIG. 8 illustrates a system flow for a process for selecting an optimal scenario for transmission in a transmitter of a frequency band adaptive communication device.

FIG. 8 illustrates a system flow (800) for the transmitter's process for selecting an optimal method or scenario for transmission. After the selection process is started (801) the transmitter selects an optimization goal (810) and identifies all constraints for the selected optimization goal (820). Support information is gathered (830) based for any number of link quality metrics including, but not limited to, evaluating interference levels (831), noise levels (832), RSSI levels (833), reported bit error rates (834), mean square error rates (835), link reliability (836), data throughput (837), transmit power level constraints (838) and cover distances (839). The transmitter then identifies all transmission scenarios that are possible and various transmission architecture parameters (840). The transmitter then weights the collected support information against for each of the possible transmission scenarios based on the selected optimization goal (850). The transmission scenarios are ranked (860) and the best transmission scenario is selected for the selected optimization goal (870). The transmitters are then configured for transmission (880) according to the selected transmission method.

The transmitter can have a variety of optimization goals in selecting a transmission method. Example transmission goals may include maximum data throughput, largest coverage distance, and/or highest link reliability (e.g., lowest bit error rate, lowest mean square error, etc.). In addition, the transmit power available for each frequency band and the total power transmitted by each device may have limits due to various regulations (e.g., FCC regulations).

Once the optimal transmission scenario is identified, the transmission can commence over multiple frequency bands simultaneously in a similar manner to the traditional single frequency band communication methods. The receiver is arranged to continuously monitor transmission performance metrics for the wireless link according to criteria such as bit error rate (BER), frame-error rate (FER), block-error-rate (BLER), or mean-square-error (MSE). The performance metrics are fed back to the transmitter to support link adaptation. Whenever the link adaptation is no longer sufficiently effective with the existing transmission scenario, the optimization function depicted in FIG. 8 is repeated.

Transmission Architectures and Methods

A variety of transmission architectures are available using the frequency band adaptive communication methods including but not limited to a frequency band multiplexing method, a multifrequency diversity method, a multiband frequency hopping method, a frequency band hopping method, a multistream frequency diversity method, a multistream frequency hopping method, a band multiplexing frequency diversity method, a band multiplexing frequency hopping method, and an FEC multiple stream method.

Figure 9:
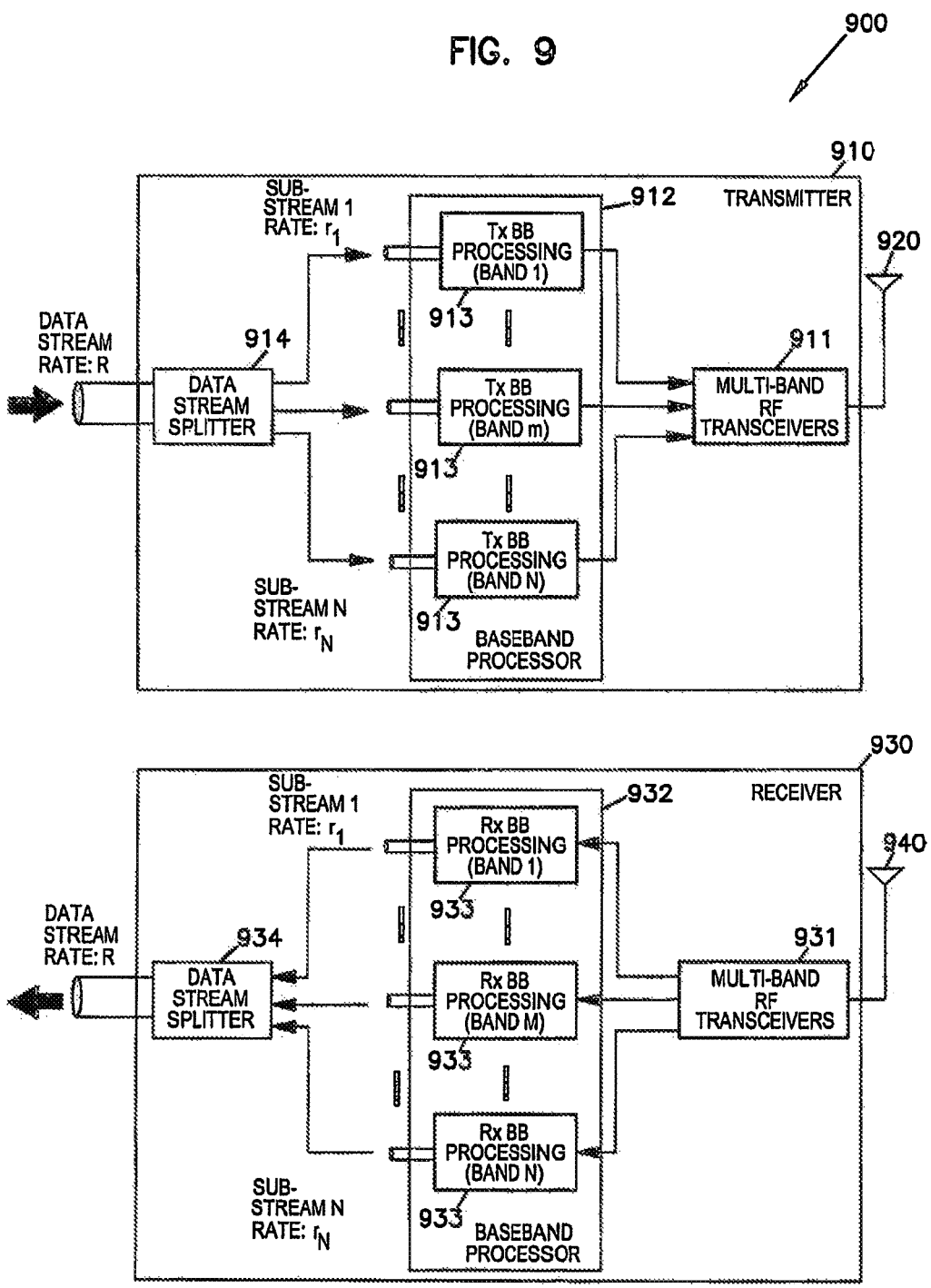
FIGS. 9-18 illustrate a variety of architectures and methods for a frequency band adaptive communication device.
Figure 10:
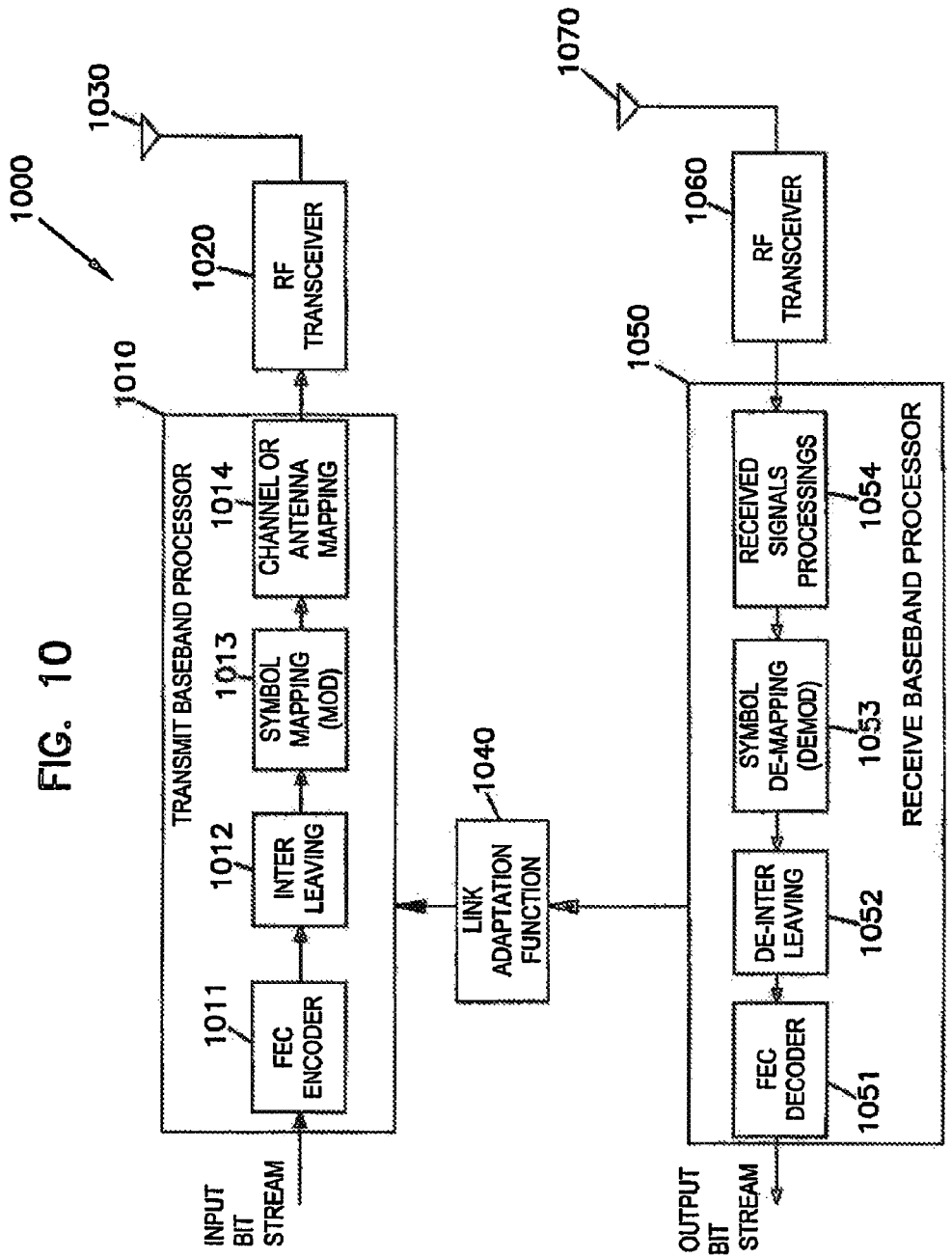

FIGS. 9 and 10 illustrate an architecture (900) for a frequency band multiplexing transmission method. This method is aimed at achieving a maximum data throughput with a certain coverage distance and link reliability. According to this method, the transmitter (910) requests a list of qualified frequency bands from the receiver (930). The transmitter screens all bands in the list against a set of transmission parameters such as transmit power limits and the minimum transmission performance requirements (e.g., BER, SER, BLER, FER, MSE, etc.). The transmitter identifies a number (e.g., "N") of qualified frequency bands, wherein each number supports at least a minimum data rate.

In the transmitter (910), the data stream is split (914) into substreams so that the baseband processor (912) can process each frequency band (913), or sublink, separately and in parallel with one another. The multiband RF transceiver(s) (911) receive the processed sublinks and transmit them via one or more antenna (920).

In the receiver (930), the multiband RF transceiver(s) (931) receives the frequency band multiplexed signal via one or more antenna (940). Each received frequency band is handled by a respective baseband processing block (933) within the baseband processor (932), which provides substreams for each frequency band. The data stream splitter (934) in the receiver (930) combines the substreams into a single data stream.

As illustrated in FIG. 10, each individual sublink is processed in the transmitter baseband processor (1010) with an FEC encoder block (1011), an interleaving block (1012), a symbol mapping or modulation block (1013) and a channel or antenna mapping block (1014). The input bit stream is processed by the transmit baseband processor (1010) and then provided to the antenna (1030) from the RF transceiver block (1020). Similarly, each individual sublink is processed in the receiver baseband processor (1050) with a received signal processing block (1054), a symbol demapping or demodulation block (1053), a deinterleaving block (1052) and an FEC decoder block (1051). The signals received from the antenna (1070) via RF transceiver (1060) are processed by the receiver baseband processor (1050) to provide an output bit stream. Various statistics and error rates are collected at the receiver baseband processor (1050) and provided to a link adaptation function (1040), which communicates with the transmit baseband processor (1010).

The frequency band multiplexing method has a peak data rate (R) for the wireless link corresponds to:

$$R = \sum_{i=1}^{N} r_i, r_i \geq R_{i\ min} > 0, i = 1 \ldots N$$

where $R_{i_{min}}$ is the minimum data rate supported by the $i^{th}$ data stream or sublink at a specific location with the minimum link performance such as BER or BLER or FER and $r_i$ is the data rate for the $i^{th}$ data stream. N is the number of frequency bands.

Figure 11:
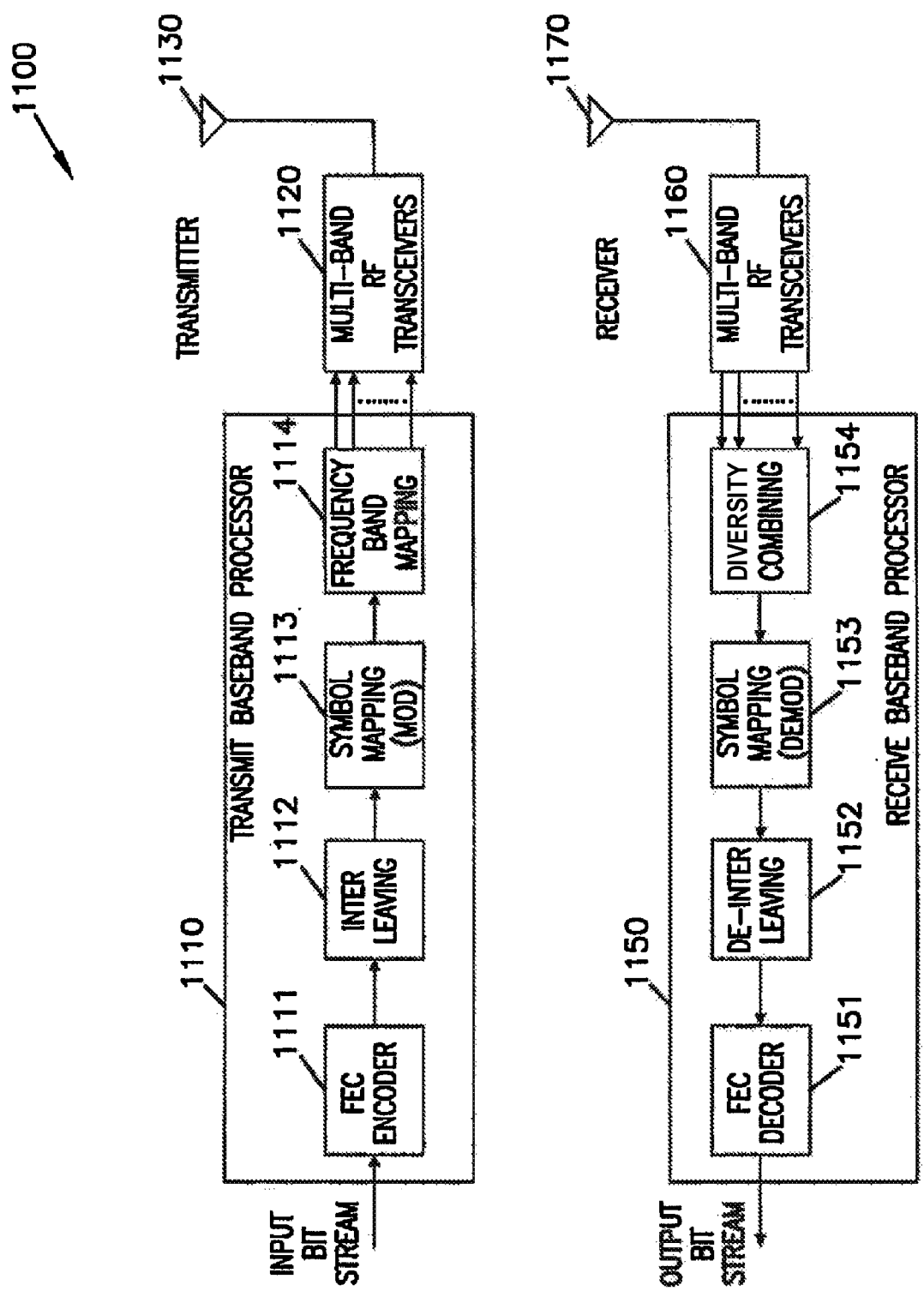

FIG. 11 illustrates a multiband frequency diversity transmission method (1100). This method is aimed at achieving a maximum coverage distance and link reliability with a certain data throughput. This method is especially effective in a deep fading environment. According to this method, the transmitter allocates transmit power to each frequency band according to the predefined FCC limit and the propagation properties of the band. The transmit baseband processor (1110) generates the coded and modulated symbol stream for the input bit stream using an FEC encoder (1111), an interleaving block (1112), a symbol mapping or modulator block (1113) and a frequency band mapping block (1114). The multiband transceiver (1120) transmits over each band via antenna 1130.

At the receiver a multiband RF transceiver (1160) receives signal via antenna 1170 and provides them to the receiver baseband processor (1150), which generates the output bit stream. The receiver baseband processor (1150) uses a diversity combining block (1154) that uses a combining algorithm such as a maximum ratio combining (MRC) or a minimum mean square error (MMSE) algorithm to generate symbols. The symbols are provided to a demapping or demodulating block (1153). The demapped symbols are deinterleaved by the deinterleaving block (1152) and decoded by the FEC decoder (1151) to provide the output bit stream. Receiver link performance parameters can again be fed back to the transmitter for adaptive coding and modulation based on the propagation conditions.

Figure 12:
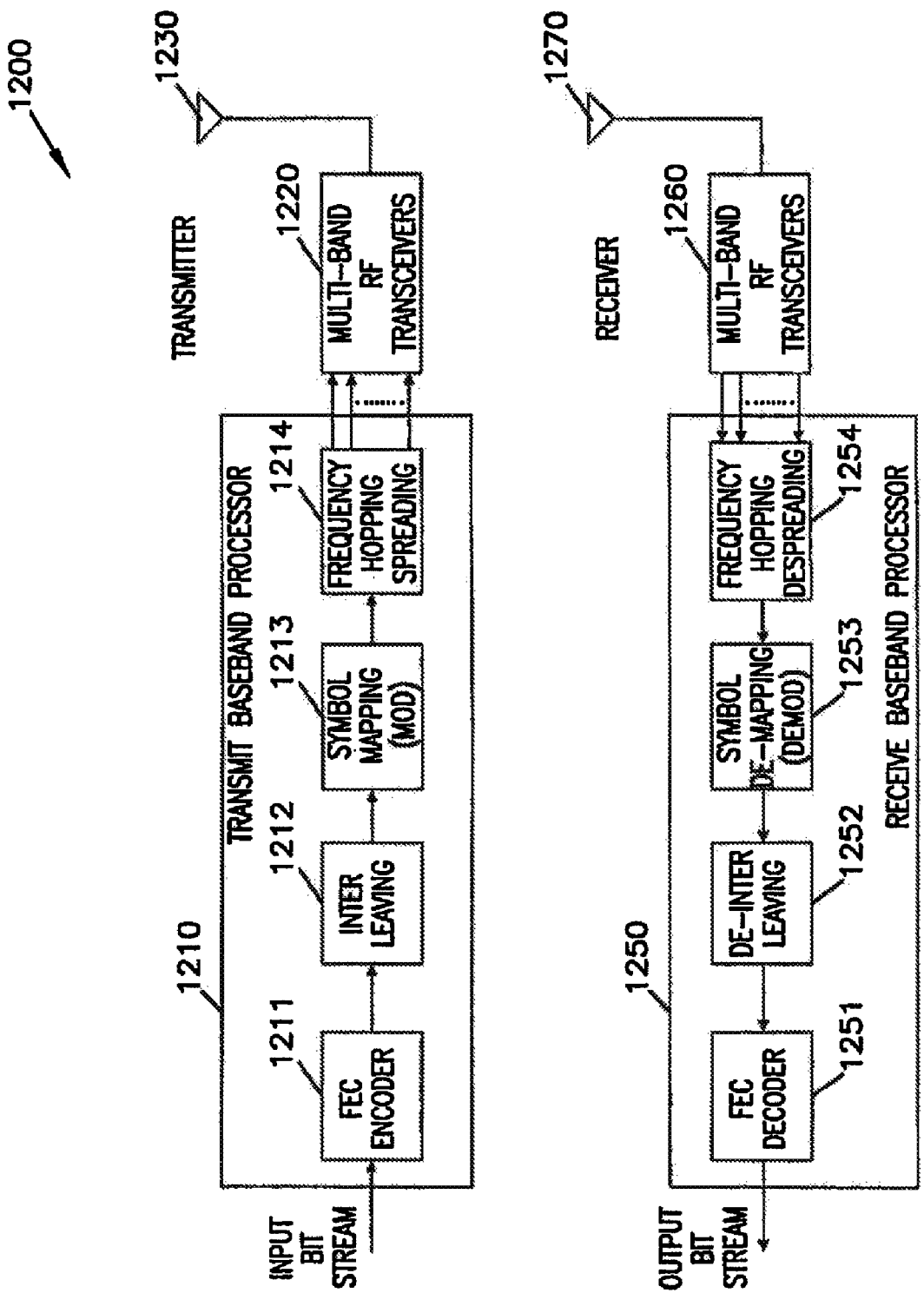

FIG. 12 illustrates a multiband frequency hopping transmission method (1200). This method is aimed at achieving a reduced interference level while achieving maximum coverage distance or link reliability. This method is especially effective for wide frequency ranges over multiple frequency bands. According to this method, the transmitter allocates transmit power to each frequency band according to the predefined FCC limit and the propagation properties of the band. The transmit baseband processor (1210) generates the coded and modulated symbol stream for the input bit stream using an FEC encoder block (1211), an interleaving block (1212), a symbol mapping or modulator block (1213) and a frequency hopping spreading block (1214). The multiband transceiver (1220) transmits over each band via the antenna (1230). The symbol stream is mapped to a frequency hopping random pattern sequence with allocated transmit power in each band.

At the receiver, a multiband RF transceiver (1260) receives signal via antenna (1270) and provides the signal to the receiver baseband processor (1250), which generates the output bit stream. The receiver baseband processor (1250) uses a frequency hopping despreader block (1254) that uses the known frequency hopping random sequence to generate symbols. The symbols are provided to a demapping or demodulating block (1253). The demapped symbols are deinterleaved by the deinterleaving block (1252) and decoded by the FEC decoder (1251) to provide the output bit stream. Receiver link performance parameters can again be fed back to the transmitter for adaptive coding and modulation based on the propagation conditions.

Figure 13:
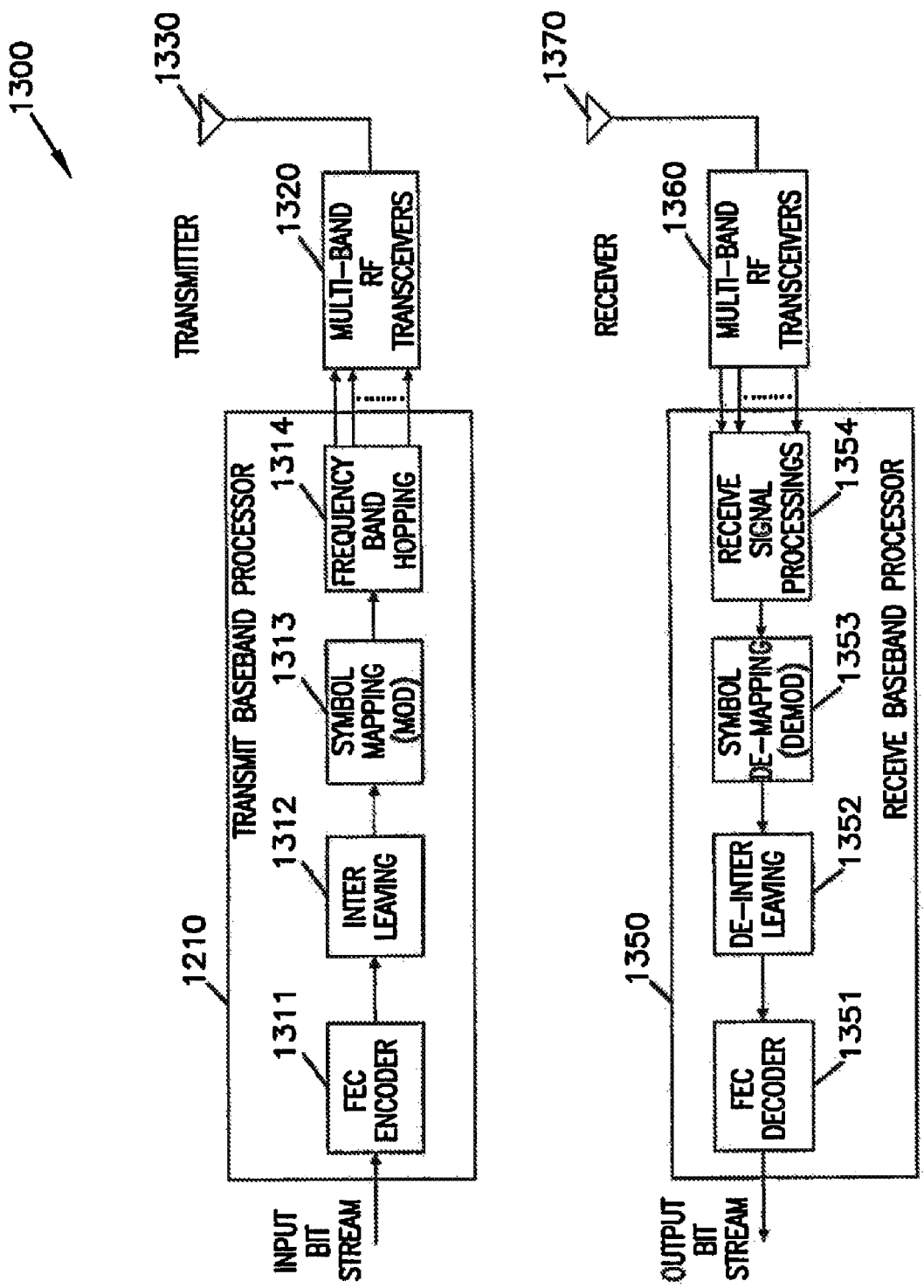

FIG. 13 illustrates a frequency band hopping transmission method (1300). This method is similar to the frequency hopping transmission method of FIG. 12 except for bandwidth and hopping patterns. The hopping pattern in this method is not necessarily random and also may not depend on the link transmission performance. According to this method, the transmitter allocates transmit power to each frequency band according to the predefined FCC limit and the propagation properties of the band. The transmit baseband processor (1310) generates the coded and modulated symbol stream for the input bit stream using an FEC encoder block (1311), an interleaving block (1312), a symbol mapping or modulator block (1313) and a frequency band hopping block (1314). The multiband transceiver (1320) transmits over one band via the antenna (1330) at a first designated time interval. For each subsequent time interval a different frequency band is used.

At the receiver, a multiband RF transceiver (1360) receives a signal via an antenna (1370) and provides a signal to the receiver baseband processor (1350), which generates the output bit stream. The receiver baseband processor (1350) uses a received signal processing block (1354) that uses the known frequency band hopping sequence to generate symbols. The symbols are provided to a demapping or demodulating block (1353). The demapped symbols are deinterleaved by the deinterleaving block (1352) and decoded by the FEC decoder (1351) to provide the output bit stream. Receiver link performance parameters can again be fed back to the transmitter for adaptive coding and modulation based on the propagation conditions.

Figure 14:
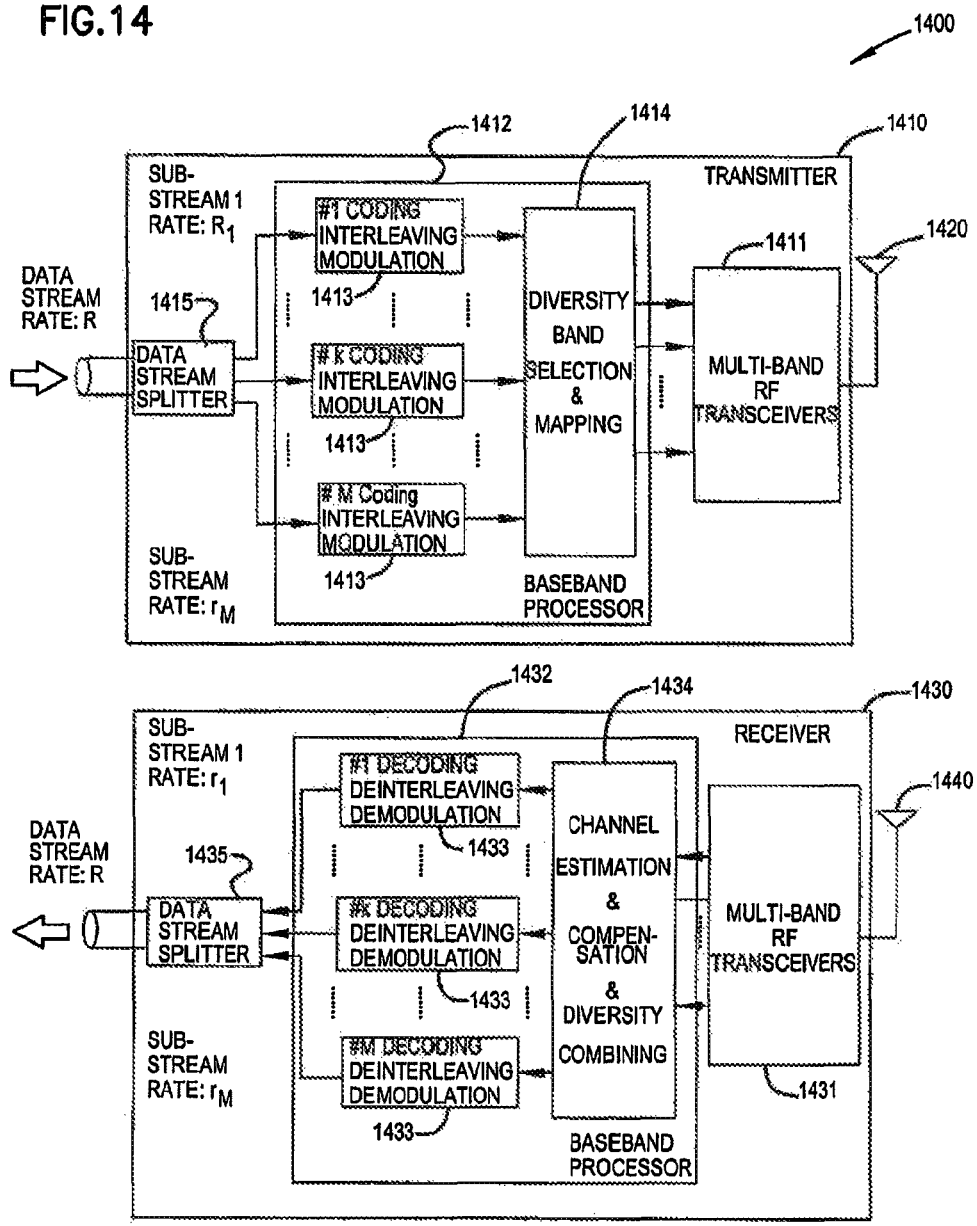

FIG. 14 illustrates an architecture (1400) for a multistream diversity transmission method. This method is an extension of the multiband frequency diversity method from FIG. 11. This method is more flexible in terms of link adaptation and available degrees of diversity. According to this method, the transmitter (1410) again requests a list of qualified frequency bands from the receiver (1430). The data stream is split (1415) into substreams so that the baseband processor (1412) can generate several individually coded/modulated symbol streams by coding/modulating blocks (1413). For each coded/modulated symbol stream, a few identical copies of the symbol stream are made for frequency diversity purposes just before the diversity band selection and mapping block (1414). For the i$^{th}$ individual coded/modulated symbol stream with $m_i$ identical copies or substreams, the diversity band selection/mapping block (1414) will select $m_i$ frequency bands and map $m_i$ identical copies or substreams into the $m_i$ frequency bands. Different coded/modulated symbol streams may share or overlap one or multiple frequency bands depending on the transmission method for a specific frequency method. The baseband processor provides the assembled multiband transmission to the multiband RF transceiver(s) (1411) for transmission via one or more antenna (1420).

In the receiver (1430), the multiband RF transceiver(s) (1431) receive the multistream diversity signals via one or more antenna (1440). The baseband processing block (1432) performs channel estimation, compensation and diversity band combining (1434) to separate symbols for each substream. The symbols from each substream are decoded, deinterleaved and demodulated by receiver baseband substream processing blocks (1433) to generate the substreams, which are subsequently combined into a single data stream by the receiver data stream splitter block (1435). The receiver baseband processor (1432) is again arranged to monitor and measure the sublink/stream performances and report the performance metrics back to the transmitter baseband processor (1412). Each individual symbol stream in the transmitter (1410) has its own coding/modulation block (1413) that adaptively optimizes the coding/modulation scheme based on received sublink/stream transmission performance.

Figure 15:
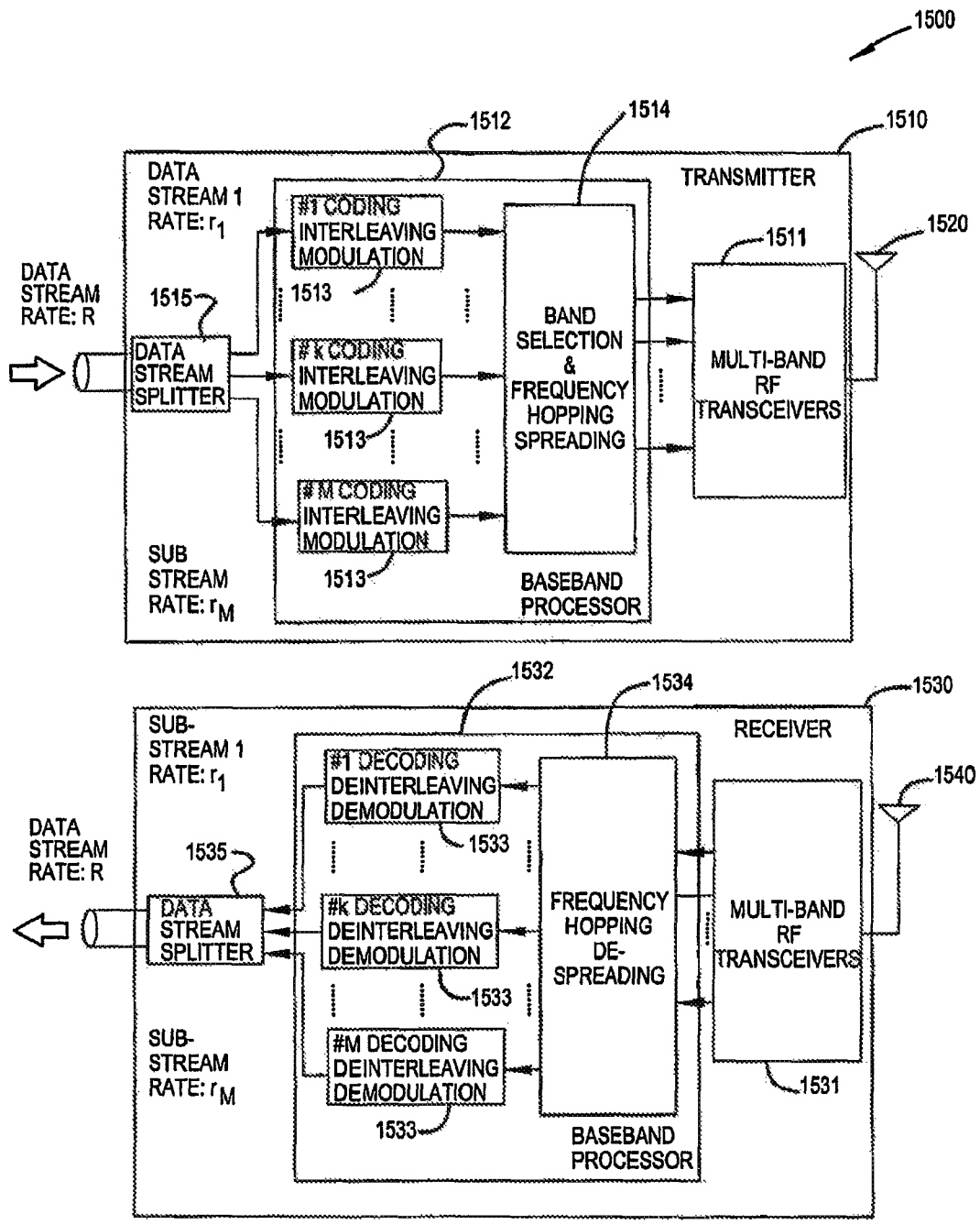

FIG. 15 illustrates an architecture (1500) for a multistream frequency hopping transmission method. This method is an extension of the multiband frequency hopping method from FIG. 12. This method is more flexible in terms of link adaptation and more effective use of the available frequency bands. According to this method, the transmitter (1510) again requests a list of qualified frequency bands from the receiver (1530). The data stream is split into substreams by a data stream splitter (1515) so that the baseband processor (1512) can generate several individually coded/modulated symbol streams by coding/modulating blocks (1513). Each coded/modulated symbol stream is mapped via a band selection/frequency hopping/spreading block (1514) according to a frequency hopping random pattern sequence over the selected set of frequency bands, with appropriate power levels allocated to each band. Different coded/modulated symbol streams may share or overlap one or multiple frequency bands depending on the transmission method for a specific frequency method. The transmitter baseband processor (1512) provides the assembled multiband transmission to the multiband RF transceiver(s) (1511) for transmission via one or more antenna (1520).

In the receiver (1530), the multiband RF transceiver(s) (1531) receive the multistream frequency hopped signals via one or more antenna (1540). The baseband processing block (1532) performs frequency hopping despreading processing functions (1534) to separate symbols for each substream. The symbols from each substream are decoded, deinterleaved and demodulated by receiver baseband substream processing blocks (1533) to generate the substreams, which are subsequently combined into a single data stream by the receiver data stream splitter block (1535). The receiver baseband processor (1532) is again arranged to monitor and measure the sublink/stream performances and report the performance metrics back to the transmitter baseband processor (1512). Each individual symbol stream in the transmitter (1510) has its own coding/modulation block (1513) that adaptively optimizes the coding/modulation scheme based on received sublink/stream transmission performance.

Figure 16:
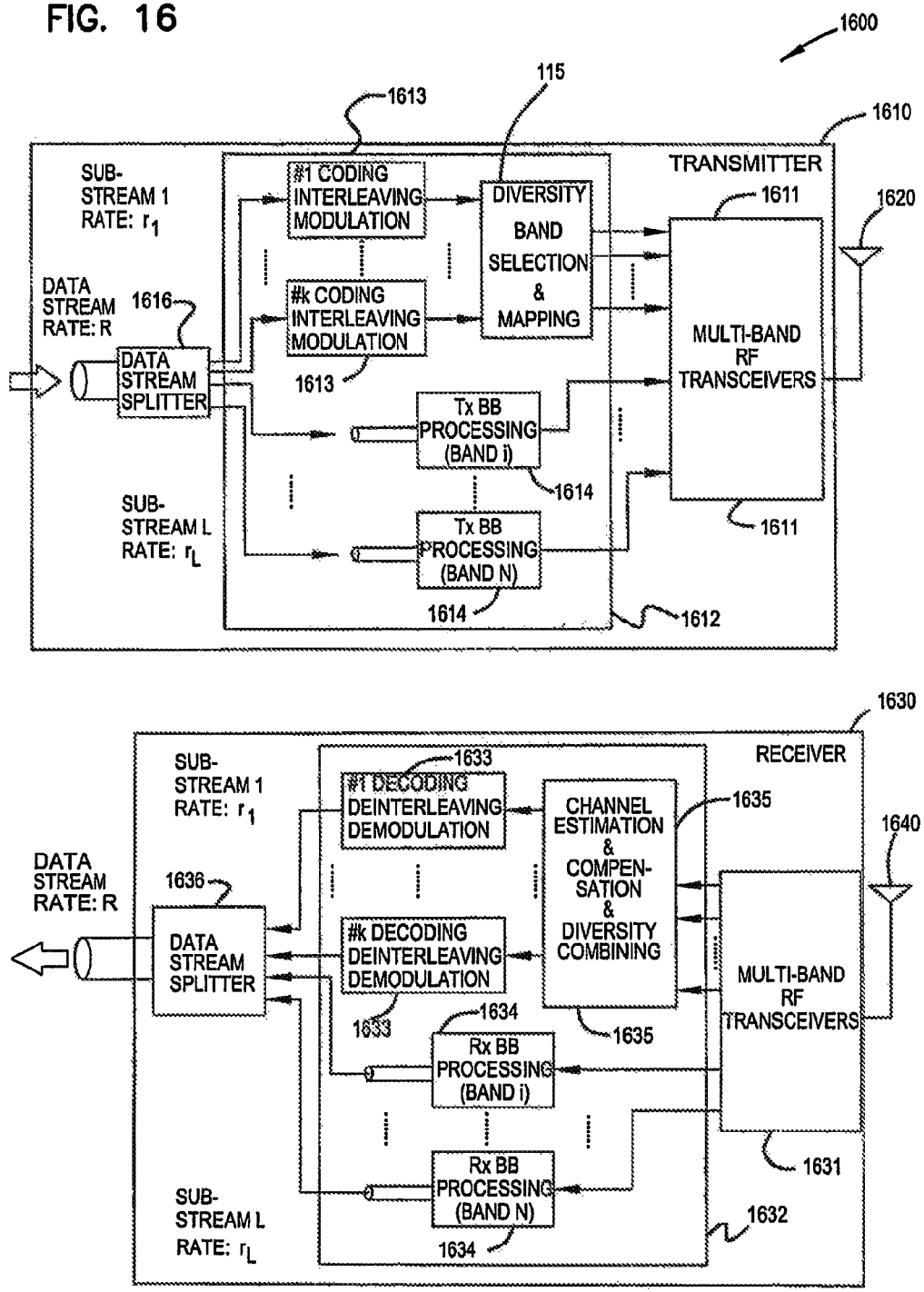

FIG. 16 illustrates an architecture (1600) for a multiband multiplexing and frequency diversity combination transmission method. This combination method takes advantage of both multiplexing and diversity methods to provide more flexibility and effective use of the available frequency bands than the other individual methods. Some frequency bands may be better than others in terms of path loss, Doppler spread, delay spread and other environmentally affected performance metrics. The combination of the two methods may mutually compensate for drawbacks of both methods so that the minimum link performance is optimized. The method is composed of two major methods: multiplexing and diversity. The multiband multiplexing portion is substantially the same as the methods described with respect to FIG. 9, while the frequency diversity portion is substantially the same as the methods described for FIG. 14. The partition of two methods is constrained with coverage distance and the minimum link performance requirements.

The transmitter (1610) again requests a list of qualified frequency bands from the receiver (1630). The data stream is again split into substreams by a data stream splitter block (1616) so that the baseband processor (1612) can generate several individually coded/modulated symbol streams with a combination of coding/modulating blocks (1613) and baseband processing blocks (1614). The coded/modulated symbol streams are mapped via a diversity band selection mapping block (1615). The transmitter baseband processor (1612) provides the multiband multiplexing and frequency diversity transmission to the multiband RF transceiver(s) (1611) for transmission via one or more antenna (1620).

The multiband RF transceiver(s) (1631) in the receiver (1630) again receives the transmission from one or more antenna (1640). The receiver baseband processing block (1632) performs channel estimation, compensation and diversity band combining (1635) to separate symbols for each substream, which are then decoded, deinterleaved and demodulated by receiver baseband substream processing blocks (1633) to generate the substreams. Additional baseband processing functions (1634) are provided for each frequency band to generate additional substreams, where all the substreams are combined by the receiver data stream splitter block (1636). The receiver baseband processor (1632) is again arranged to monitor and measure the sublink/stream performances and report the performance metrics back to the transmitter baseband processor (1612) for adaptive optimization of the sublinks/streams in the transmitter (1610).

Figure 17:
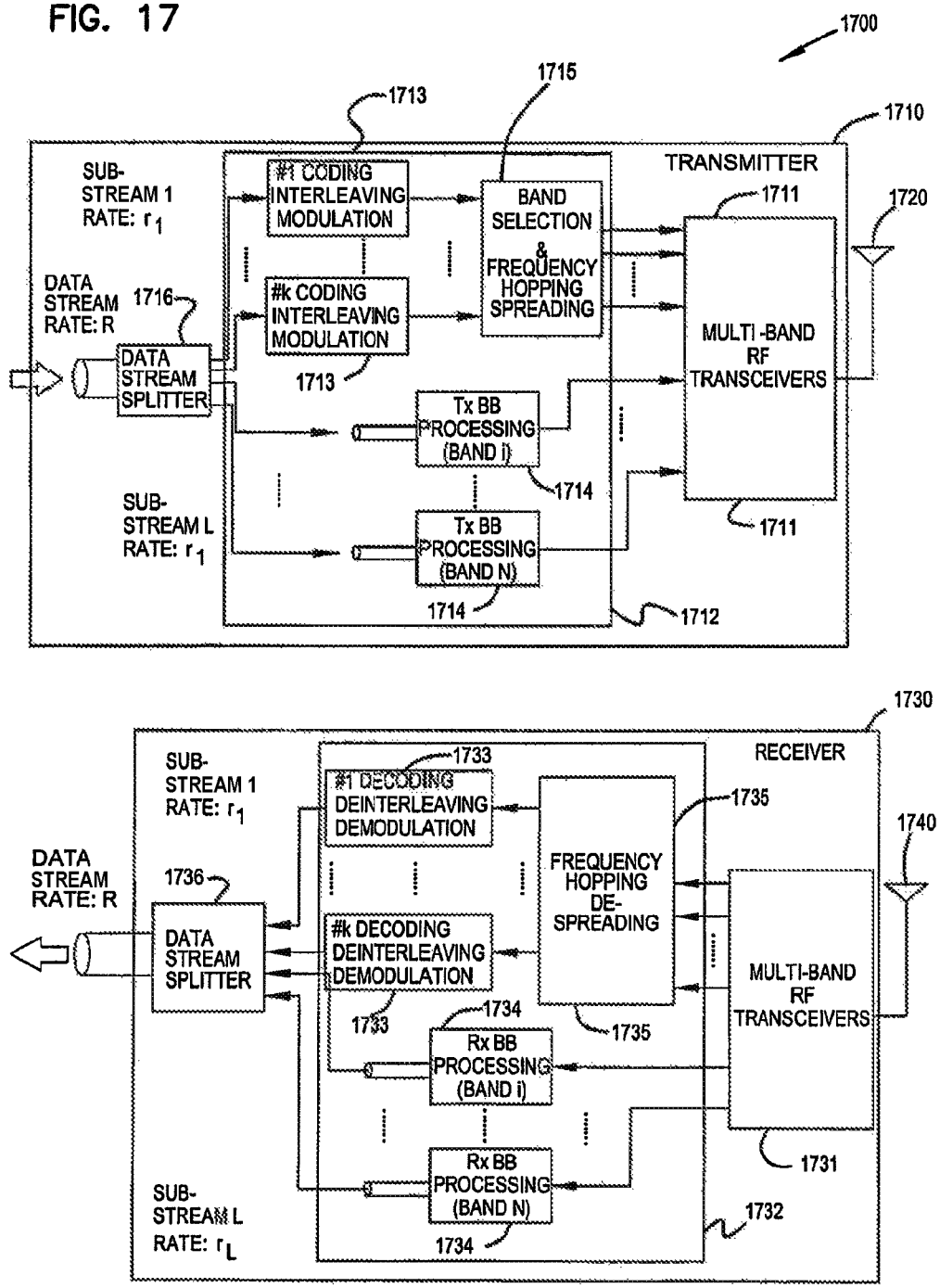

FIG. 17 illustrates an architecture (1700) for a multiband multiplexing and frequency hopping combination transmission method. This combination method takes advantage of both multiband multiplexing and frequency hopping methods to provide more flexibility and effective use of the available frequency bands than the other individual methods. Some frequency bands may be better than others in terms of path loss, Doppler spread, delay spread and other environmentally affected performance metrics. The combination of the two methods may mutually compensate for drawbacks of both methods so that the minimum link performance is optimized. The method is composed of two major methods: multiplexing and frequency hopping. The multiband multiplexing portion is substantially the same as the methods described with respect to FIG. 9, while the frequency hopping portion is substantially the same as the methods described for FIG. 15. The partition of two methods is constrained with coverage distance and the minimum link performance requirements.

The transmitter (1710) again requests a list of qualified frequency bands from the receiver (1730). The data stream is again split into substreams by a data stream splitter block (1716) so that the baseband processor (1712) can generate several individually coded/modulated symbol streams with a combination of coding/interleaving/modulating blocks (1713) and baseband processing blocks (1714). The symbol streams are mapped via a band selection and frequency hopping/spreading block (1715). The transmitter baseband processor (1712) provides the multiband multiplexing and frequency hopping transmission to the multiband RF transceiver(s) (1711) for transmission via one or more antenna (1720).

The multiband RF transceiver(s) (1731) in the receiver (1730) again receives the transmission from one or more antenna (1740). The receiver baseband processing block (1732) performs frequency hopping despreading functions (1735) to separate symbols for each substream, which are then decoded, deinterleaved and demodulated by receiver baseband substream processing blocks (1733) to generate the sub streams. Additional baseband processing functions (1734) are provided for each frequency band to generate additional substreams, wherein all of the substreams are combined by the receiver data stream splitter block (1736). The receiver baseband processor (1732) is again arranged to monitor and measure the sublink/stream performances and report the performance metrics back to the transmitter baseband processor (1712) for adaptive optimization of the sublinks/streams in the transmitter (1710).

Figure 18:
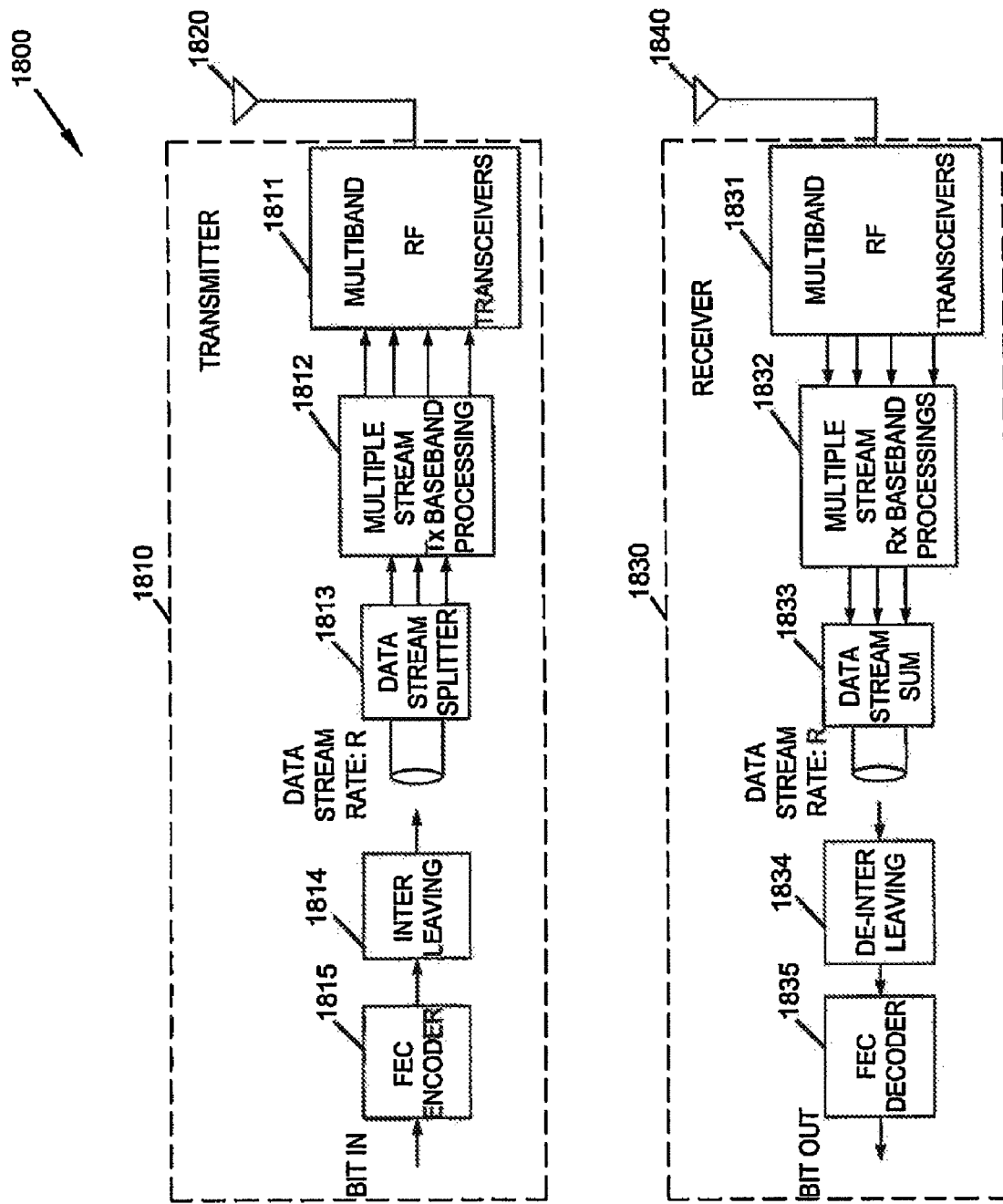

FIG. 18 shows a method of a FEC scheme concatenated with a multiband/multistream method described previously. The method is composed of an FEC method and a multiband/multistream method.

The transmitter (1810) for this combined method is comprised of an FEC encoder block (1815), an interleaving block (1814), a data stream splitter block (1813), a multistream baseband processor block (1812) and multiband RF transceivers (1811). The bit input to the transmitter is encoded by the FEC encoder block (1815) and interleaved by the interleaving block (1814) prior to splitting into multiple streams by the data stream splitter block (1813). The streams from the data stream splitter block (1813) are processed by the baseband processing block (1812) in a similar manner to that previously described so that the multiband RF transceivers (1811) can transmit the assembled signals via one or more antennas (1820). The receiver (1830) for this combined method is similarly arranged and comprised of multiband RF transceivers (1831), a multistream baseband processor block (1832), a data stream splitter block (1833), a deinterleaving block (1834) and an FEC decoder block (1835).

With multiband/multistream transmission methods, the link performance may not be uniformly satisfactory over multiple frequency bands. By adding an additional FEC encoder and additional interleaving functions, all data streams are crossed and thus multiple frequency bands will further enhance the overall link transmission performance. This method may be able to tolerate larger degradation in any individual data stream or transmission over a specific frequency band than the multiband/multistream methods described previously.

Combined Transmission Architectures and Methods

Figure 19:
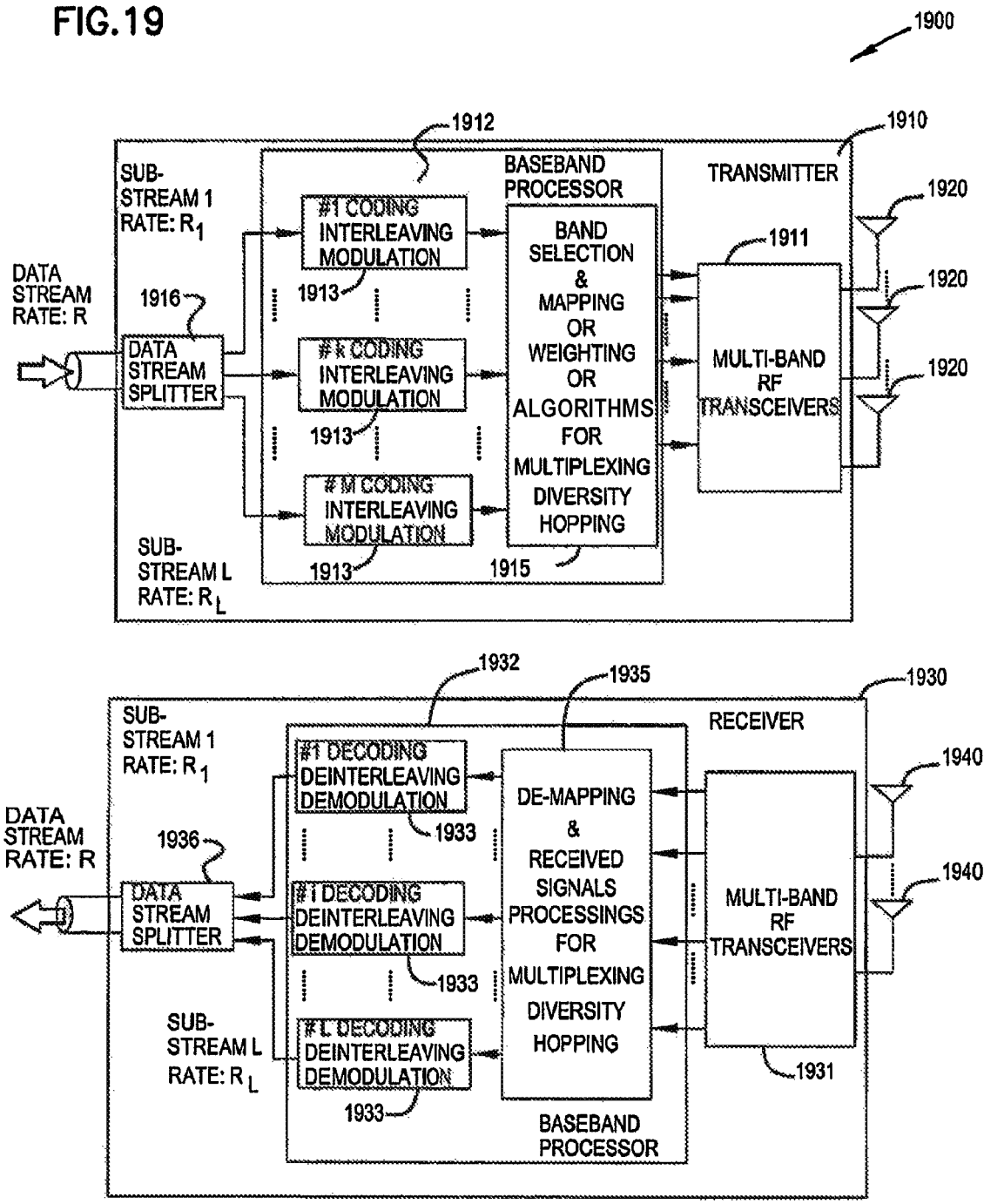
FIG. 19 illustrates a general architecture and method for a frequency band adaptive communication device.

The above described transmission architectures are combined into a general transmission architecture that is depicted in FIG. 19. The general architecture assumes that multiple frequency bands and multiple antennas may be employed at both transmitter and receiver of a wireless link and that each multiband RF transceiver for both the receiver and transmitter are arranged to cover N frequency bands. It is further assumed that any individual transmission or sublink over a specific frequency band can use $M_t$ antennas at the transmitter and $M_r$ antennas at the receiver.

The transmitter (1910) is comprised of multiband RF transceiver blocks (1911), a baseband processor block (1912) and a data stream splitter block (1916). The baseband processor block (1912) can be functionally and/or physically partitioned into coding/interleaving/modulating functions (1913) for each stream and band selection/mapping/weighting/multiplexing/hopping/diversity processing functions (1915). Similar to that previously described, the transmitter (1910) requests a list of qualified frequency bands from the receiver (1930). The data stream is split into substreams by the data stream splitter block (1916) so that the baseband processor (1912) can generate (1913) several individually coded/modulated/interleaved symbol streams. The symbol streams are algorithmically processed (1915) by the baseband processor (1912) to provide band selection, mapping, weighting and other functions necessary for frequency band selection, multiplexing and diversity for the selected communication method. The transmitter baseband processor (1912) is arranged to provide the frequency band adapted transmission to the multiband RF transceiver(s) (1911) for transmission via one or more antennas (1920).

The receiver (1930) is similarly arranged to the transmitter block and comprised of multiband RF transceiver blocks (1931), a baseband processor block (1932) and a data stream splitter block (1936). The baseband processor block (1932) for the receiver (1930) can also be functionally and/or physically partitioned into decoding/deinterleaving/demodulating functions (1933) for each stream and band processing/demapping/de-multiplexing/hopping despreading/diversity combining processing functions (1935). The receiver baseband processor (1932) is again arranged to monitor and measure the sublink/stream performances and report the performance metrics back to the transmitter baseband processor (1912) for adaptive optimization of the sublinks/streams in the transmitter (1910).

The general transmission method can be further described as follows. The baseband processor (1912) in the transmitter (1910) can generate L independent coded/modulated symbol streams, depending on the transmission gain to be achieved, where L>0. For example, L=Mt×N for frequency band/spatial multiplexing methods and L<Mt×N for diversity or hopping gain methods. In each coded/modulated symbol stream or sublink, there may be "k" FEC coding rates and "n" levels of modulation. For example, k=4 has code rates of 2/3, 3/4, 7/8; n=4 QAM modulation levels: BPSK, QPSK, 16-QAM, and 64-QAM. As a result, there are a total of sixteen coding/modulation combinations.

The functional blocks in the baseband processor (1912) at the transmitter (1910) provide all mapping, weighting and hopping algorithms. The functional blocks in baseband processor (1912) at the transmitter (1910) can also map and/or weight independent coded/modulated symbol streams into N frequency bands and Mt transmit antennas to achieve the maximum transmission performance gains such as data throughput, coverage distance and link reliability through the following methods: frequency band/spatial multiplexing, frequency/space diversity, frequency hopping, frequency band hopping, FEC concatenated with a multiband/multistream method and combinations of the described methods.

The functional blocks in the baseband processor (1932) at the receiver (1930) conduct demapping and necessary received signal processing. The other baseband processing functions in the receiver (1930) perform demodulation, decoding and combining functions.

Both the transmitter and receiver baseband processors include all link adaptation functions/algorithms for an individual symbol stream over a specific frequency band or over multiple frequency bands. Transmit power management algorithms are also included in the baseband processors for both the transmitter and the receiver.

The total data rate of the wireless link is the sum of all independent streams or sublinks is given by:

$$R = \sum_{i=1}^{L} r_i, ri \geq R_{i\,min} > 0, i = 1 \ldots L$$

where $R_{i_{min}}$ is the minimum data rate supported by the $i^{th}$ data stream or sublink at a specific location with the minimum link performance such as BER or BLER or FER. $R_i$ is the data rate of the $i^{th}$ data stream or sublink.

The above described baseband processors can be implemented with a general purpose device such as a microprocessor or a microcontroller, or as a special purpose device such as a digital signal processor (DSP). With such devices, all wireless link transmission algorithms can be provided as firmware that can be downloaded into these devices. The link adaptation method described herein employs a multitude of algorithms such that the functionally partitions in the baseband processing functions can be provided as software or firmware, where the software can be dynamically configured to rearrange or change processing functions to achieve an objective using a particular algorithm.

The present disclosure is applicable in a wide range of applications. Spectral efficiency is improved at reduced radio transmission costs, with reasonable performance. The technologies can be applied to any wireless transmission system. Large and/or small service providers, especially those service providers who may not have adequate spectrum to provide wireless broadband services similar to WLAN, may use the presently described techniques. In one example, a service provider may operate a WLAN in both unlicensed and the new nonexclusive licensed bands to experience less interference. In another example, a service provider may operate a WLAN-based broadband wireless access network over different bands in a small town, community, isolated sectors of some city centers or some indoor environments.

The above specification, examples and data provide a complete description of the manufacture and use of the composition of the embodiments. Although the subject matter has been described in language specific to structural features and/or methods, it is to be understood that the subject matter defined in the appended claims is not necessarily limited to the specific features or specific implementations described above. Many other configurations of computing devices, communications features, applications and distributed software and/or hardware systems may be employed to implement the described dynamic user interface. While many of the examples described herein focus on FCC operating bands, the present disclosure is not so limited and other international frequency bands are contemplated such as those monitored and published by the International Telecommunications Union (ITU). The specific features and methods described above are thus disclosed as example forms of implementing the claims and embodiments.

What is claimed is:

1. A frequency band adaptive wireless communication system, comprising:
   one or more antennas; and
   one or more processors communicatively coupled with the antennas, the one or more processors configured to:
      analyze a plurality of frequency bands for a direct radio communication link;
      select at least two frequency bands from the plurality of frequency bands for the direct radio communication link; and
      cause the direct radio communication link to be established using the at least two frequency bands.

2. The frequency band adaptive wireless communication system of claim 1, wherein each particular frequency band of the at least two frequency bands is selected based at least in part on one or more radio signal quality metrics associated with a link of the particular frequency band.

3. The frequency band adaptive wireless communication system of claim 2, wherein the one or more radio signal quality metrics comprise at least one of a noise level, an interference level, a noise plus interference level, a received signal strength indicator (RSSI) level, a signal-to-noise rating, a signal-to-noise-plus-interference rating, a bit-error-rate (BER), a symbol-error-rate (SER), a block-error-rate (BLER), a frame-error-rate (FER), a mean-square error (MSE), a spectral integrity or a data throughput rate.

4. The frequency band adaptive wireless communication system of claim 1, wherein the selecting at least two frequency bands is based at least in part on a transmission goal.

5. The frequency band adaptive wireless communication system of claim 4, wherein the transmission goal comprises at least one of maximum data throughput, largest coverage distance, or highest link reliability.

6. The frequency band adaptive wireless communication system of claim 1, wherein the one or more processors are further configured to monitor at least one transmission performance metric of the direct radio communication link.

7. The frequency band adaptive wireless communication system of claim 6, wherein the at least one transmission performance metric comprises at least one of: bit-error-rate (BER), block-error-rate (BLER), frame-error-rate (FER), or mean-square-error (MSE).

8. The frequency band adaptive wireless communication system of claim 1, wherein the analyzing the plurality of frequency bands for the direct radio communication link comprises monitoring frequency band conditions.

9. The frequency band adaptive wireless communication system of claim 8, wherein the frequency band conditions include one or more of: noise levels, interference levels, noise plus interference levels, and received signal strength indicator levels.

10. The frequency band adaptive wireless communication system of claim 1, wherein at least one of the at least two frequency bands corresponds to at least one of a licensed frequency band, an unlicensed frequency band, a semi-licensed frequency band, or an overlapped frequency band.

11. A method, comprising:
    analyzing a plurality of frequency bands for a direct radio communication link;

selecting at least two frequency bands from the plurality of frequency bands for the direct radio communication link; and causing the direct radio communication link to be established using the at least two frequency bands.

12. The method of claim 11, wherein each particular frequency band of the at least two frequency bands is selected based at least in part on one or more radio signal quality metrics associated with a link of the particular frequency band.

13. The method of claim 12, wherein the one or more radio signal quality metrics comprise at least one of a noise level, an interference level, a noise plus interference level, a received signal strength indicator (RSSI) level, a signal-to-noise rating, a signal-to-noise-plus-interference rating, a bit-error-rate (BER), a symbol-error-rate (SER), a block-error-rate (BLER), a frame-error-rate (FER), a mean-square error (MSE), a spectral integrity or a data throughput rate.

14. The method of claim 11, wherein the selecting at least two frequency bands is based at least in part on a transmission goal.

15. The method of claim 14, wherein the transmission goal comprises at least one of maximum data throughput, largest coverage distance, or highest link reliability.

16. The method of claim 11, wherein the analyzing the plurality of frequency bands for the direct radio communication link comprises monitoring frequency band conditions.

17. The method of claim 16, wherein the frequency band conditions include one or more of: noise levels, interference levels, noise plus interference levels, and received signal strength indicator levels.

18. The method of claim 11, wherein at least one of the at least two frequency bands corresponds to at least one of a licensed frequency band, an unlicensed frequency band, a semi-licensed frequency band, or an overlapped frequency band.

19. A computer-readable, non-transitory storage medium having one or more computer-executable instructions that when executed by a processor cause the processor to:

analyze a plurality of frequency bands for a direct radio communication link;

select at least two frequency bands from the plurality of frequency bands for the direct radio communication link; and cause the direct radio communication link to be established using the at least two frequency bands.

20. The computer-readable, non-transitory storage medium of claim 19, wherein the analyzing the plurality of frequency bands for the direct radio communication link comprises monitoring one or more of: noise levels, interference levels, noise plus interference levels, and received signal strength indicator levels.

* * * * *